(12) United States Patent
Kanda

(10) Patent No.: US 8,627,372 B2
(45) Date of Patent: Jan. 7, 2014

(54) INFORMATION PROCESSING APPARATUS, INFORMATION PROCESSING METHOD, AND PROGRAM

(75) Inventor: Satoshi Kanda, Tokyo (JP)

(73) Assignee: Sony Corporation (JP)

( * ) Notice: Subject to any disclaimer, the term of this patent is extended or adjusted under 35 U.S.C. 154(b) by 300 days.

(21) Appl. No.: 12/931,734

(22) Filed: Feb. 9, 2011

(65) Prior Publication Data

US 2011/0202962 A1 Aug. 18, 2011

(30) Foreign Application Priority Data

Feb. 17, 2010 (JP) ................................ P2010-032996

(51) Int. Cl.
H04N 5/445 (2011.01)
(52) U.S. Cl.
USPC ............................................. 725/46; 725/48
(58) Field of Classification Search
USPC .................................................... 725/37–61
See application file for complete search history.

(56) References Cited

U.S. PATENT DOCUMENTS

| | | | |
|---|---|---|---|
| 6,791,119 B2 * | 9/2004 | Slater et al. ...................... | 257/99 |
| 6,971,119 B1 * | 11/2005 | Arsenault et al. ................ | 725/89 |
| 7,292,692 B2 * | 11/2007 | Bonan et al. ..................... | 380/212 |
| 2001/0046295 A1 * | 11/2001 | Sako et al. ....................... | 380/201 |
| 2001/0049822 A1 | 12/2001 | Yoshida et al. | |
| 2005/0144499 A1 * | 6/2005 | Narahara et al. .................. | 714/1 |
| 2008/0147487 A1 * | 6/2008 | Hirshberg ......................... | 705/10 |

FOREIGN PATENT DOCUMENTS

| | | | |
|---|---|---|---|
| JP | 2001-160955 A | 6/2001 |
| JP | 2005-167628 A | 6/2005 |

* cited by examiner

*Primary Examiner* — Hai V Tran
*Assistant Examiner* — Jen-Shi Huang
(74) *Attorney, Agent, or Firm* — Lerner, David, Littenberg, Krumholz & Mentlik, LLP

(57) ABSTRACT

A package identifier generating unit generates, for each unique combination of information on specific items included in a package, a package identifier identifying the combination. A first table registering unit extracts information on the specific items from the obtained package, and registers the information on the specific items, a user identifier identifying a user of a program reproducing apparatus being a transfer source of the package, and the generated package identifier in correspondence with each other, in a first table. A second table registering unit extracts a correspondence relation between the user identifier and the package identifier from the first table, and registers the package identifier corresponding to the user identifier, as a program view history for each user, in a second table. A determining unit determines the package identifier being a difference between program view histories similar to each other registered in the second table.

12 Claims, 14 Drawing Sheets

Package table

| Package ID | Program ID | Broadcast start time | Program length | Genre | ... | User-country information | Viewed number | User ID |
|---|---|---|---|---|---|---|---|---|
| ... | ... | ... | ... | ... | ... | ... | ... | ... |
| 21 | *** | *** | *** | *** | ... | *** | 92247 | 23 |
| 22 | *** | *** | *** | *** | ... | *** | 33124 | 14,18 |
| 23 | *** | *** | *** | *** | ... | *** | 100000 | 1,4 |
| 24 | *** | *** | *** | *** | ... | *** | 9526 | 6 |
| 25 | *** | *** | *** | *** | ... | *** | 172100 | 5,17 |
| 26 | *** | *** | *** | *** | ... | *** | 65554 | 8,11 |
| ... | ... | ... | ... | ... | ... | ... | ... | ... |

FIG.7

CF table

| User ID | Package ID | Package ID | Package ID | Package ID |
|---|---|---|---|---|
| 1 | 1 | 10 | 12 | -- |
| 2 | 3 | 14 | 18 | -- |
| 3 | 4 | 14 | 18 | -- |
| 4 | 10 | 12 | 19 | -- |
| 5 | 2 | 14 | 25 | -- |
| 6 | 5 | 11 | 15 | -- |
| ... | ... | ... | ... | ... |

FIG.8

CF table

| User ID | Package ID | Package ID | Package ID | Package ID | Package ID |
|---|---|---|---|---|---|
| 1 | 1 | 10 | 12 | 23 | ... |
| 2 | 1 | 14 | 18 | -- | ... |
| 3 | 4 | 14 | 18 | -- | ... |
| 4 | 10 | 12 | 19 | 23 | ... |
| 5 | 2 | 14 | 25 | -- | ... |
| 6 | 5 | 11 | 15 | -- | ... |
| ... | ... | ... | ... | ... | ... |

FIG.9

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2010-032996 filed in the Japanese Patent Office on Feb. 17, 2010, the entire content of which is incorporated herein by reference.

BACKGROUND OF THE INVENTION

1. Field of the Invention

The present invention relates to an information processing apparatus used as a server apparatus offering a program recommendation service, an information processing method, and a program.

2. Description of the Related Art

In recent years, there is proposed a system of estimating a program in conformity with preference of a user from various programs broadcasted or delivered via transmission media such as broadcast waves and the Internet, and recommending the program to the user. In such a system, representative examples of the method of estimating a program in conformity with preference of a user include, for example, Content-Based-Filtering (CBF), Collaborative-Filtering (CF), and the like.

In Content-Based-Filtering, information on programs viewed by a user before is stored as preference information of the user, similarities between the preference information and information on programs being broadcasted and to be broadcasted are calculated, and a program of high similarity is determined as a recommended program (for example, Japanese Patent Application laid-open No. 2001-160955, hereinafter, referred to as Patent Document 1). Meanwhile, in Collaborative-Filtering method, program view histories of a plurality of users are stored as preference information of the users, and a recommended program for each of the users is determined based on differences of the program view histories of a plurality of users whose program view histories are similar to each other (for example, Japanese Patent Application laid-open No. 2005-167628, hereinafter, referred to as Patent Document 2).

SUMMARY OF THE INVENTION

In the both methods of Content-Based-Filtering and Collaborative-Filtering, to identify a program, a program. ID being a program-unique identifier determined under a broadcast standard is used. The program ID is structured by network_id, transport_stream_id, service_id, event_id, and the like. Of those, network_id, transport_stream_id, and service_id are identifiers identifying a program offering target. Event_id is an identifier identifying a program. Uniqueness of the program ID is only ensured in countries and territories employing the same broadcast standard. Therefore, in a case where a target area of a program recommendation service by a server is enlarged to a plurality of countries and territories whose broadcast standards are different from each other, to identify a program with a program ID will actually be difficult.

In view of the above, a method of adding and using, not only a program ID, but also a title, contents, and the like of a program as information for identifying the program is conceived. However, in this case, there is a high possibility that secondary use of information such as a title, contents, and the like of a program is limited by its intellectual property rights such as trademark rights or copyrights, and such information is communicated between a user apparatus and a server via an IP network. Therefore, it is predicted that actual introduction of the system is hampered because, for example, licenses of secondary use should be issued by right holders in the world with regard to secondary use of information such as titles, contents, and the like of a number of programs.

In view of the above-mentioned circumstances, it is desirable to provide an information processing apparatus, an information processing method, and a program with which a program recommendation service targeting a plurality of countries and territories whose broadcast standards are different from each other is well performed, without using information such as a title, contents, and the like of a program, the possibility that secondary use of which is limited by its intellectual property right is high.

In view of the above-mentioned circumstances, according to an embodiment of the present invention, there is provided an information processing apparatus, including: a package obtaining unit configured to obtain, from at least one program reproducing apparatus, the at least one program reproducing apparatus being configured to obtain program information including information on a plurality of items for each broadcast program, to selectively receive and reproduce the broadcast program, and to transfer a package including information on a plurality of previously-determined specific items failing to include, as a content, information whose secondary use is limited by its intellectual property right, in the program information on a program viewed by a user, the package; a first table storing unit configured to store a first table; a package identifier generating unit configured to generate, for each unique combination of information on the plurality of specific items included in the obtained package, a package identifier identifying the combination; a first table registering unit configured to extract information on the plurality of specific items from the obtained package, and to register the information on the plurality of specific items, a user identifier identifying a user of a program reproducing apparatus being a transfer source of the package, and the generated package identifier in correspondence with each other, in the first table; a second table storing unit configured to store a second table; a second table registering unit configured to extract a correspondence relation between the user identifier and the package identifier from the first table, and to register the at least one package identifier corresponding to the user identifier, as a program view history for each user, in the second table; a determining unit configured to determine the at least one package identifier being a difference between a plurality of program view histories similar to each other registered in the second table; and a notifying unit configured to notify a program reproducing apparatus of a recommendation-target-user of at least part of information on the plurality of specific items registered in the first table corresponding to the package identifier determined by the determining unit.

Although each piece of information on a plurality of previously-determined specific items failing to include, as a content, information whose secondary use is limited by its intellectual property right is not enough to identify a program, a combination of information on a plurality of items may be enough to identify a program. In view of the above, according to the information processing apparatus according to this embodiment of the present invention, the second table registering unit uses a package identifier generated for each unique combination of information on the above-mentioned plurality of specific items as information corresponding to a program, and registers a program view history for each user in the second table. The determining unit determines at least one package identifier being a difference between a plurality of program view histories similar to each other registered in the second table. Further, the notifying unit notifies a program reproducing apparatus of a recommendation-target-user of at least part of information on a plurality of specific items registered in the first table corresponding to the determined package identifier. Therefore, according to this embodiment of the present invention, a program recommendation service targeting a plurality of countries and territories whose broadcast standards are different from each other is well performed, without using information such as a title, contents, and the like of a program, the possibility that secondary use of which is limited by its intellectual property right is high.

The information processing apparatus according to an embodiment of the present invention may further include an obtaining number managing unit configured to manage an obtaining number of the package for each package identifier. The second table registering unit may be configured to extract a correspondence relation between the package identifier of the package whose obtaining number reaches a threshold and the user identifier. Therefore, a package identifier corresponding to a combination of information on a plurality of specific items whose obtaining number is low is not registered in the second table. So the load of processing is reduced, and registering a package identifier corresponding to a combination of information on a plurality of specific items, which is ungeneratable under normal circumstances, in the second table in error is avoided. Therefore, reliability of the program recommendation service is improved.

In the information processing apparatus according to an embodiment of the present invention, the determining unit may be configured to refer to the second table according to a program recommendation request including the user identifier from a program reproducing apparatus of a program-recommendation-request-source-user, and determine another user whose program view history is similar to the program view history of the program-recommendation-request-source-user, and to determine, as the difference, at least one package identifier in the program view history of the other user, the at least one package identifier failing to be included in the program view history of the program-recommendation-request-source-user. The notifying unit may be configured to notify the program reproducing apparatus of the program-recommendation-request-source-user of at least part of information on the plurality of specific items registered in the first table corresponding to the package identifier determined by the determining unit. Therefore, it is possible to notify, with respect to a program recommendation request including the user identifier from the program reproducing apparatus of the program-recommendation-request-source-user, the program reproducing apparatus of the program-recommendation-request-source-user of information on a plurality of specific items corresponding to the determined recommended program. Meanwhile, the program reproducing apparatus compares the notified information on a plurality of specific items and program information stored in the program reproducing apparatus, to thereby identify a recommended program.

The plurality of specific items in the program information may at least include an item of a program identifier uniquely allocated to each program in conformity with broadcast standard, and an item of information on broadcast date and time. In a case where the target area of the program recommendation service is enlarged to a plurality of countries and territories whose broadcast standards are different from each other, there is a possibility that a plurality of different programs of the same program ID coexist, but there is little probability that the broadcast date and time of the plurality of programs is the same. Therefore, by using a combination of information on a plurality of specific items at least including an item of a program identifier and an item of information on broadcast date and time, the program recommendation service targeting a plurality of countries and territories whose broadcast standards are different from each other is well performed.

In the information processing apparatus according to an embodiment of the present invention, the package identifier generating unit may be configured to generate a package identifier identifying each unique combination of information on the plurality of specific items included in the obtained package and user-country information previously set to the program reproducing apparatus. The first table registering unit may be configured to register information on the plurality of specific items, the user identifier, the user-country information, and the generated package identifier in correspondence with each other, in the first table. Therefore, the program recommendation service targeting a plurality of countries and territories whose broadcast standards are different from each other is also well performed.

In the information processing apparatus according to an embodiment of the present invention, the determining unit may be configured to refer to the second table, and determine two users whose program view histories are similar to each other, to determine, based on a difference of the program view histories of the users, a package identifier for each user corresponding to a program recommended to each of the users, and to extract information on the plurality of specific items corresponding to the package identifier for each user from the first table. The notifying unit may be configured to notify a program reproducing apparatus of each of the users of information on the plurality of specific items corresponding to the package identifier for each of the users extracted by the determining unit. Therefore, it is possible to automatically notify the program reproducing apparatus of information on a plurality of specific items corresponding to a recommended program, without depending on a program recommendation request from the program reproducing apparatus by the user.

In the information processing apparatus according to an embodiment of the present invention, a piece of information on the plurality of specific items may be a program identifier uniquely allocated to each program in conformity with broadcast standard. The information processing apparatus may further include a program-information-for-countries obtaining unit configured to obtain program information for a plurality of countries/territories in a target area, and a program-information-for-countries storing unit configured to store the obtained program information for the plurality of countries/territories. The determining unit may be configured to refer to the second table according to a program recommendation request including the user identifier and the user-country information from a program reproducing apparatus of a program-recommendation-request-source-user, and determine another user whose program view history is similar to the program view history of the program-recommendation-request-source-user, to determine, as a package identifier of a recommended program, at least one package identifier in the program view history of the other user, the at least one package identifier failing to be included in the program view history of the program-recommendation-request-source-user, to determine, based on user-country information included in the program recommendation request, program information for a corresponding country/territory in program information for the plurality of countries/territories stored in the program-information-for-countries storing unit, and to determine a consistency between information on a plurality of specific items corresponding to a package identifier of the recommended program and the determined program information for the country/territory. The notifying unit may be configured to notify, in a case where the determining unit determines the consistency, a program reproducing apparatus of the program-recommendation-request-source-user of the program identifier in information on the plurality of specific items corresponding to a package identifier of the recommended program.

According to another embodiment of the present invention, there is provided an information processing method, including: obtaining, by a package obtaining unit, from at least one program reproducing apparatus, the at least one program reproducing apparatus being configured to obtain program information including information on a plurality of items for each broadcast program, to selectively receive and reproduce the broadcast program, and to transfer a package including information on a plurality of previously-determined specific items failing to include, as a content, information whose secondary use is limited by its intellectual property right, in the program information on a program viewed by a user, and a user identifier of the user, the package; generating, by a package identifier generating unit, for each unique combination of information on the plurality of specific items included in the obtained package, a package identifier identifying the combination; extracting, by a first table registering unit, information on the plurality of specific items from the obtained package, and registering the information on the plurality of specific items, a user identifier identifying a user of a program reproducing apparatus being a transfer source of the package, and the generated package identifier in correspondence with each other, in a first table; extracting, by a second table registering unit, a correspondence relation between the user identifier and the package identifier from the first table, and registering the at least one package identifier corresponding to the user identifier, as a program view history for each user, in a second table; determining, by a determining unit, the at least one package identifier being a difference between a plurality of program view histories similar to each other registered in the second table; and notifying, by a notifying unit, a program reproducing apparatus of a recommendation-target-user of at least part of information on the plurality of specific items registered in the first table corresponding to the determined package identifier.

According to another embodiment of the present invention, there is provided a program, causing a computer to function as: a package obtaining unit configured to obtain, from at least one program reproducing apparatus, the at least one program reproducing apparatus being configured to obtain program information including information on a plurality of items for each broadcast program, to selectively receive and reproduce the broadcast program, and to transfer a package including information on a plurality of previously-determined specific items failing to include, as a content, information whose secondary use is limited by its intellectual property right, in the program information on a program viewed by a user, the package; a first table storing unit configured to store a first table; a package identifier generating unit configured to generate, for each unique combination of information on the plurality of specific items included in the obtained package, a package identifier identifying the combination; a first table registering unit configured to extract information on the plurality of specific items from the obtained package, and to register the information on the plurality of specific items, a user identifier identifying a user of a program reproducing apparatus being a transfer source of the package, and the generated package identifier in correspondence with each other, in the first table; a second table storing unit configured to store a second table; a second table registering unit configured to extract a correspondence relation between the user identifier and the package identifier from the first table, and to register the at least one package identifier corresponding to the user identifier, as a program view history for each user, in the second table; a determining unit configured to determine the at least one package identifier being a difference between a plurality of program view histories similar to each other registered in the second table; and a notifying unit configured to notify a program reproducing apparatus of a recommendation-target-user of at least part of information on the plurality of specific items registered in the first table corresponding to the package identifier determined by the determining unit.

Further, according to another embodiment of the present invention, there is provided an information processing apparatus, including: a package obtaining unit configured to obtain, from at least one program reproducing apparatus, the at least one program reproducing apparatus being configured to obtain program information including information on a plurality of items including a program identifier uniquely allocated to each program in conformity with broadcast standard, for each broadcast program, to selectively receive and reproduce the broadcast program, and to transfer a package including the program identifier in the program information on a program viewed by a user, the package; a first table storing unit configured to store a first table; a package identifier generating unit configured to generate, for each unique combination of the program identifier included in the obtained package and user-country information previously set to the program reproducing apparatus, a package identifier identifying the combination; a first table registering unit configured to extract the program identifier from the obtained package, and to register the program identifier, the user-country information, and the generated package identifier in correspondence with each other, in the first table; a second table storing unit configured to store a second table; a second table registering unit configured to extract a correspondence relation between the user identifier and the package identifier from the first table, and to register the at least one package identifier corresponding to the user identifier, as a program view history for each user, in the second table; a determining unit configured to determine the at least one package identifier being a difference between a plurality of program view histories similar to each other registered in the second table; and a notifying unit configured to notify a program reproducing apparatus of a recommendation-target-user of the program identifier and the user-country information registered in the first table corresponding to the package identifier determined by the determining unit.

According to the embodiments of the present invention, a program recommendation service targeting a plurality of countries and territories whose broadcast standards are different from each other is well performed, without using information such as a title, contents, and the like of a program, the possibility that secondary use of which is limited by its intellectual property right is high.

These and other objects, features and advantages of the present invention will become more apparent in light of the following detailed description of best mode embodiments thereof, as illustrated in the accompanying drawings.

BRIEF DESCRIPTION OF DRAWINGS

FIG. 7 shows an example of a package table;

FIG. 8 shows an example of a CF table;

FIG. 9 shows an example of updating the CF table;

DESCRIPTION OF PREFERRED EMBODIMENTS

Hereinafter, embodiments of the present invention will be described with reference to the drawings.

First Embodiment (System Structure)

Figure 1:
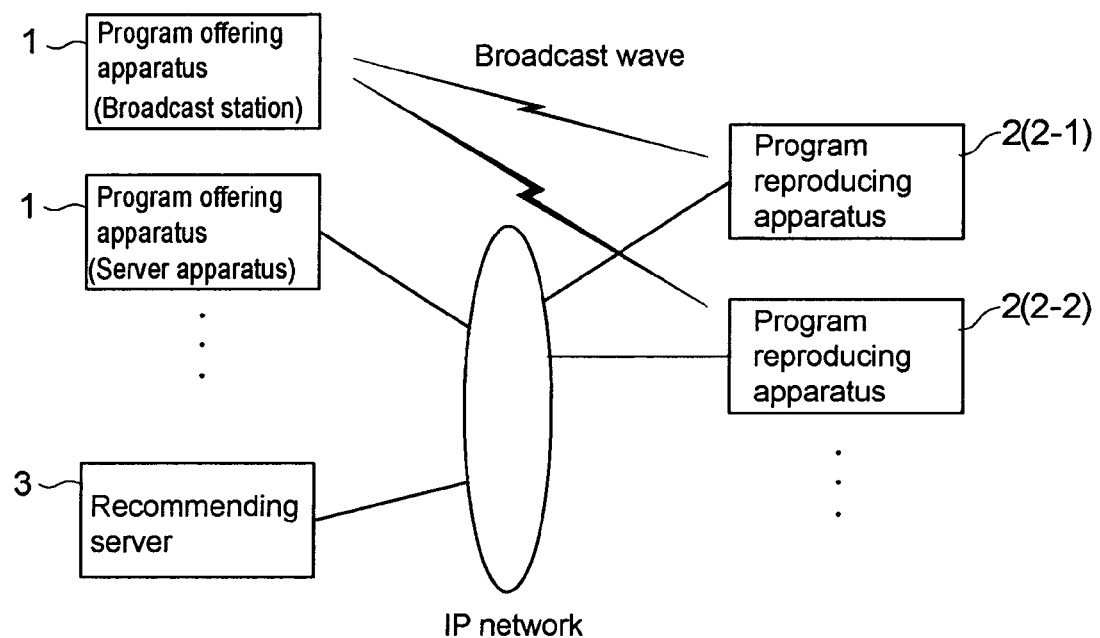
FIG. 1 is a diagram showing the structure of an entire system including an information processing apparatus according to a first embodiment of the present invention.

FIG. 1 is a diagram showing the structure of an entire system including an information processing apparatus according to an embodiment of the present invention. As shown in FIG. 1, the system includes at least one program offering apparatus 1, a plurality of program reproducing apparatuses 2 (2-1, 2-2), and a recommending server 3 (information processing apparatus).

The program offering apparatus 1 is, for example, a broadcast station, a server apparatus, or the like. The program offering apparatus 1 transfers digital broadcast programs (hereinafter, referred to as "programs") via communication media such as, for example, terrestrial waves, satellite waves, and an IP network. The program offering apparatus 1 is capable of multiplexing and transferring stream packets of a program and packets of program information including various information on a program currently broadcasted.

The program reproducing apparatus 2 receives digital broadcast signals of a program from the program offering apparatus 1 via the communication media such as the terrestrial waves, the satellite waves, and the IP network (Internet), separates transport stream packets of the program from the digital broadcast signals, decodes the transport stream packets, to thereby decompress video signals and audio signals of the program, and outputs the video signals and the audio signals through a display unit and a speaker unit. Further, the program reproducing apparatus 2 is capable of separating packets of program information from the received digital broadcast signals, decoding the packets, and storing the packets as data that the program reproducing apparatus 2 is capable of using appropriately.

The recommending server 3 is a server offering, to a user of each of the program reproducing apparatuses 2 connected via the IP network, a service for recommending a program in conformity with preference of the user.

Note that, the program reproducing apparatus 2 is, more specifically, a television apparatus, a personal computer, a recording apparatus, a reproducing apparatus, a game apparatus, a mobile terminal (including mobile phone), or the like. An arbitrary product mode is applied to the embodiments of the present invention.

(Structure of Program Reproducing Apparatus 2)

Next, the structure of the program reproducing apparatus 2 of this embodiment will be described.

Figure 2:
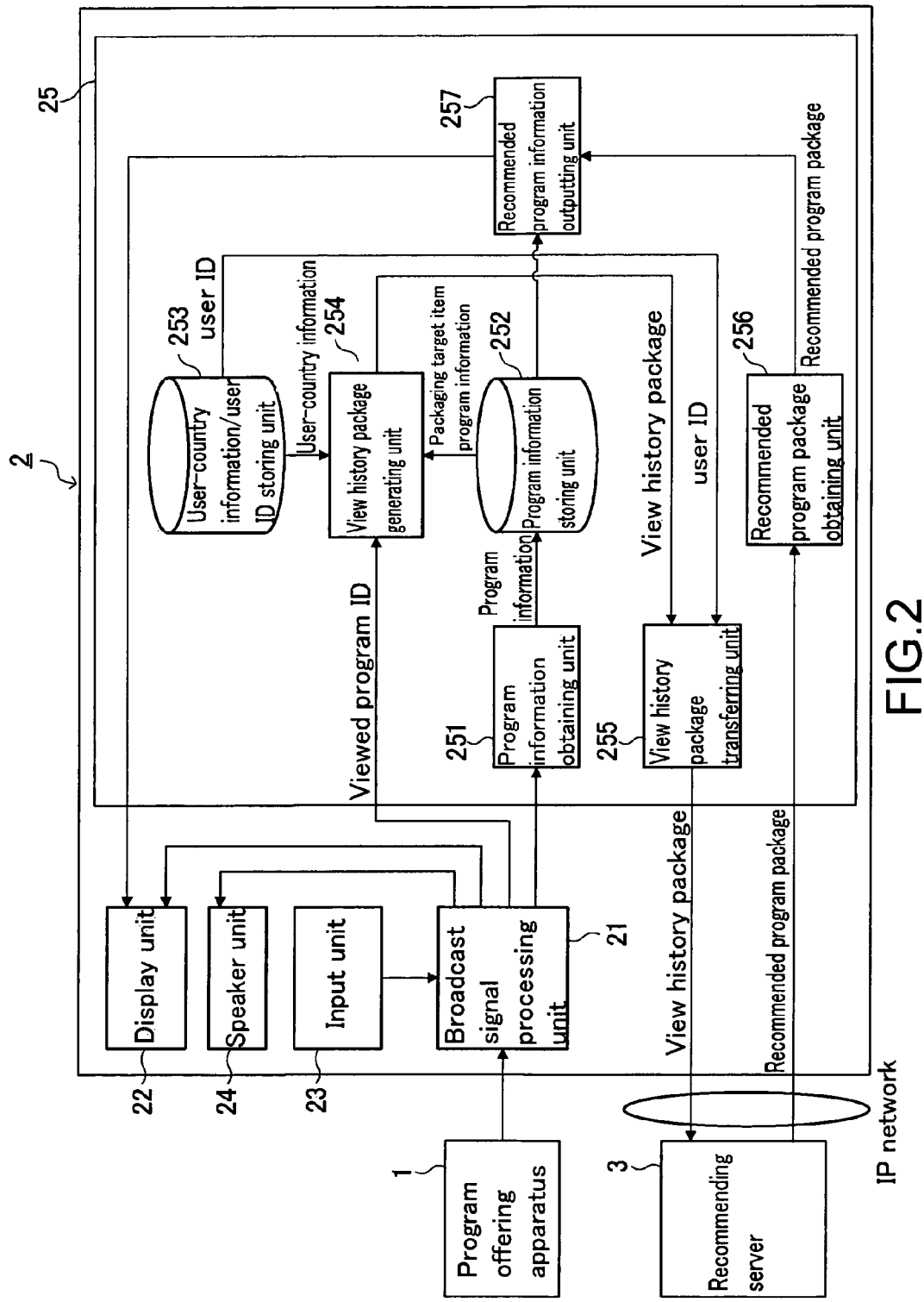
FIG. 2 is a diagram showing the structure of a program reproducing apparatus of FIG. 1.

FIG. 2 is a diagram showing the structure of the program reproducing apparatus 2.

As shown in FIG. 2, the program reproducing apparatus 2 includes a broadcast signal processing unit 21, a display unit 22, an input unit 23, a speaker unit 24, and a program recommendation processing unit 25.

The broadcast signal processing unit 21 receives digital broadcast signals from the program offering apparatus 1 via communication media such as the terrestrial waves, the satellite waves, and the IP network, separates stream packets of the program from the digital broadcast signals, decodes the stream packets, to thereby decompress (reproduce) the video signals and the audio signals of the program, and outputs the video signals and the audio signals through the display unit 22 and the speaker unit 24. The broadcast signal processing unit 21 will be described in detail.

The display unit 22 outputs the video signals decompressed from the digital broadcast signals by the broadcast signal processing unit 21 as visible information. The input unit 23 receives various operation instructions and data input by a user. The speaker unit 24 outputs sounds based on audio signals decompressed from the digital broadcast signals by the broadcast signal processing unit 21. The display unit 22, the input unit 23, and the speaker unit 24 may be built-in units or external units.

The program recommendation processing unit 25 performs necessary processing for accepting a program recommendation service offered by the recommending server 3. The program recommendation processing unit 25 is, more specifically, implemented by typical computer hardware including a CPU (Central Processing Unit) and a main memory, and a program running the computer hardware.

Further, the program reproducing apparatus 2 may include a nonvolatile storage unit such as a hard disk drive or a flash drive. In this case, the program reproducing apparatus 2 is capable of recording video signals and audio signals of a received program in the storage unit. Further, the program reproducing apparatus 2 is also capable of reproducing video signals and audio signals of the program recorded in the storage unit.

Here, the broadcast signal processing unit 21 will be described in detail.

Figure 3:
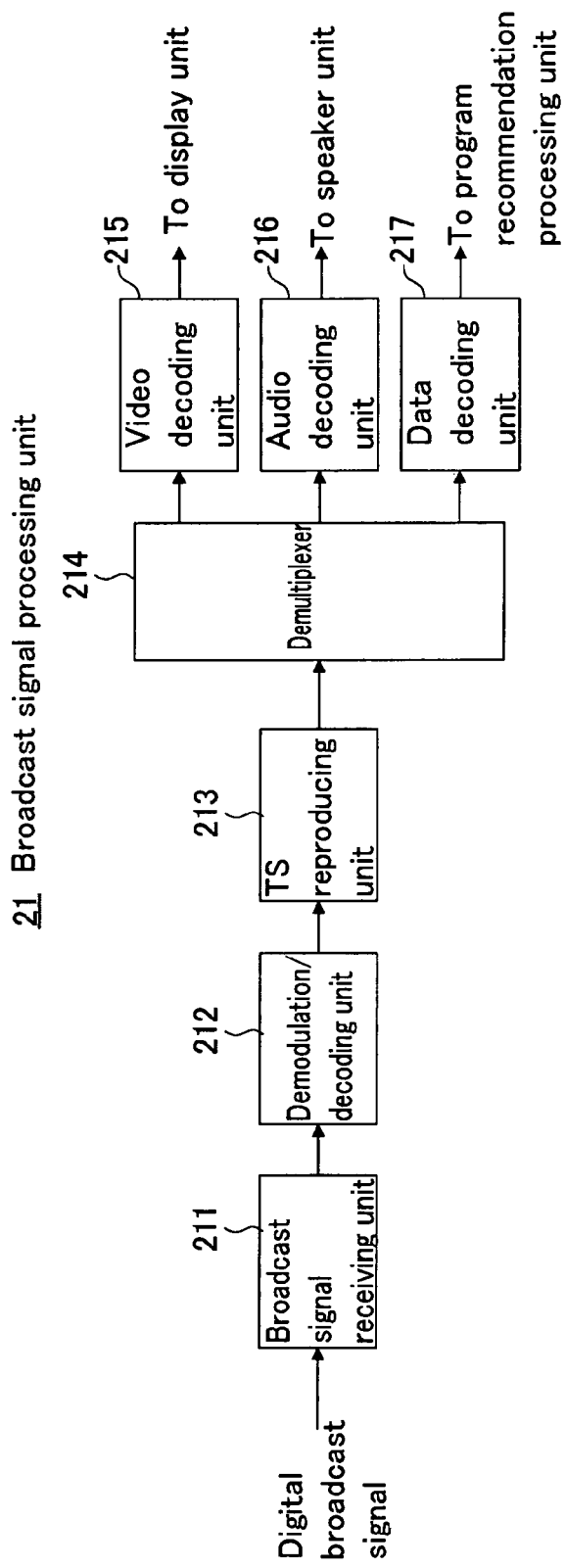
FIG. 3 is a diagram showing the structure of a broadcast signal processing unit of FIG. 2.

FIG. 3 is a diagram showing the structure of the broadcast signal processing unit 21.

The broadcast signal processing unit 21 includes a broadcast signal receiving unit 211, a demodulation/decoding unit 212, a transport stream (TS) reproducing unit 213, a demultiplexer 214, a video decoding unit 215, an audio decoding unit 216, a data decoding unit 217, and the like. The structure thereof is similar to the structure of a typical receiving apparatus receiving programs via communication media such as terrestrial waves, satellite waves, and the IP network.

The broadcast signal receiving unit 211 is, more specifically, a tuner tuning and receiving, via antennas, digital broadcast signals transferred from broadcast stations via broadcast media such as terrestrial waves and satellite waves, or an IP network connector unit receiving IP multicast broadcast signals via the IP network.

The demodulation/decoding unit 212 demodulates and decodes the digital broadcast signals received by the broadcast signal receiving unit 211 using a method according to transmission modes (modulation system, encoding ratio, and the like), and supplies the signals to the transport stream reproducing unit 213.

The transport stream reproducing unit 213 reproduces a transport stream based on signals supplied from the demodulation/decoding unit 212, to supply to the demultiplexer 214.

The demultiplexer 214 separates data streams and the like such as a video stream, an audio stream, and program information from the transport stream supplied from the transport stream reproducing unit 213, and supplies them to the video decoding unit 215, the audio decoding unit 216, and the data decoding unit 217, respectively.

The video decoding unit 215 decodes the video stream supplied from the demultiplexer 214, and supplies video signals to the display unit 22. The audio decoding unit 216 decodes the audio stream supplied from the demultiplexer 214, and supplies audio signals to the speaker unit 24. The data decoding unit 217 decodes the data stream of the program information and the like supplied from the demultiplexer 214, and supplies decode results of the program information to the program recommendation processing unit 25.

(Structure of Program Recommendation Processing Unit 25)

Referring back to FIG. 2, the structure of the program recommendation processing unit 25 will be described. The program recommendation processing unit 25 includes a program information obtaining unit 251, a program information storing unit 252, a user-country information/user ID storing unit 253, a view history package generating unit 254, a view history package transferring unit 255, a recommended program package obtaining unit 256, and a recommended program information outputting unit 257.

The program information obtaining unit 251 obtains program information from the broadcast signal processing unit 21, and causes the program information storing unit 252 to store the program information. The program information storing unit 252 is a storage area storing program information.

The user-country information/user ID storing unit 253 is a storing unit storing user-country information and a user ID (user identifying information). The user-country information is information preset in the user-country information/user ID storing unit 253 before shipment of the program reproducing apparatus 2. For example, in the user-country information/user ID storing unit 253 of an information processing apparatus shipped in Japan, "Japan" is recorded as the user-country information. The user ID is an ID for identifying a user, allocated to a user through a user registration process performed by the user of the program reproducing apparatus 2 with respect to the recommending server 3.

The view history package generating unit 254 extracts information on a plurality of previously-determined specific items from the program information stored in the program information storing unit 252 with regard to a program viewed by a user, and produces a view history package by packaging the information on the plurality of specific items, and the user-country information and the user ID stored in the user-country information/user ID storing unit 253. The information on the plurality of specific items will be described later.

The view history package transferring unit 255 transfers the view history package generated by the view history package generating unit 254 to the recommending server 3 via the IP network.

The recommended program package obtaining unit 256 obtains a recommended program package being a program recommendation result from the recommending server 3, and supplies the recommended program package to the recommended program information outputting unit 257.

The recommended program information outputting unit 257 compares the recommended program package supplied from the recommended program package obtaining unit 256 and the program information stored in the program information storing unit 252, to thereby identify a recommended program, and presents information on the identified recommended program to a user through the display unit 22.

(Structure of Recommending Server 3)

Next, the structure of the recommending server 3 will be described.

The recommending server 3 is structured by typical computer hardware including a CPU (Central Processing Unit), a main memory, a ROM (Read Only Member), a storage unit, an input unit, a display unit, an IP network connector unit, and the like, and software such as an OS (Operating System) and an application program running the computer hardware. The storage unit is, for example, a hard disk drive, a flash drive, or the like, and stores, in addition to the OS, the application program for causing a computer to execute the program recommendation service, and various data. The OS and the application program is appropriately loaded from the storage unit to the main memory, and interpreted and executed by the CPU, to thereby cause the computer to function as the recommending server 3 performing the program recommendation service.

Figure 4:
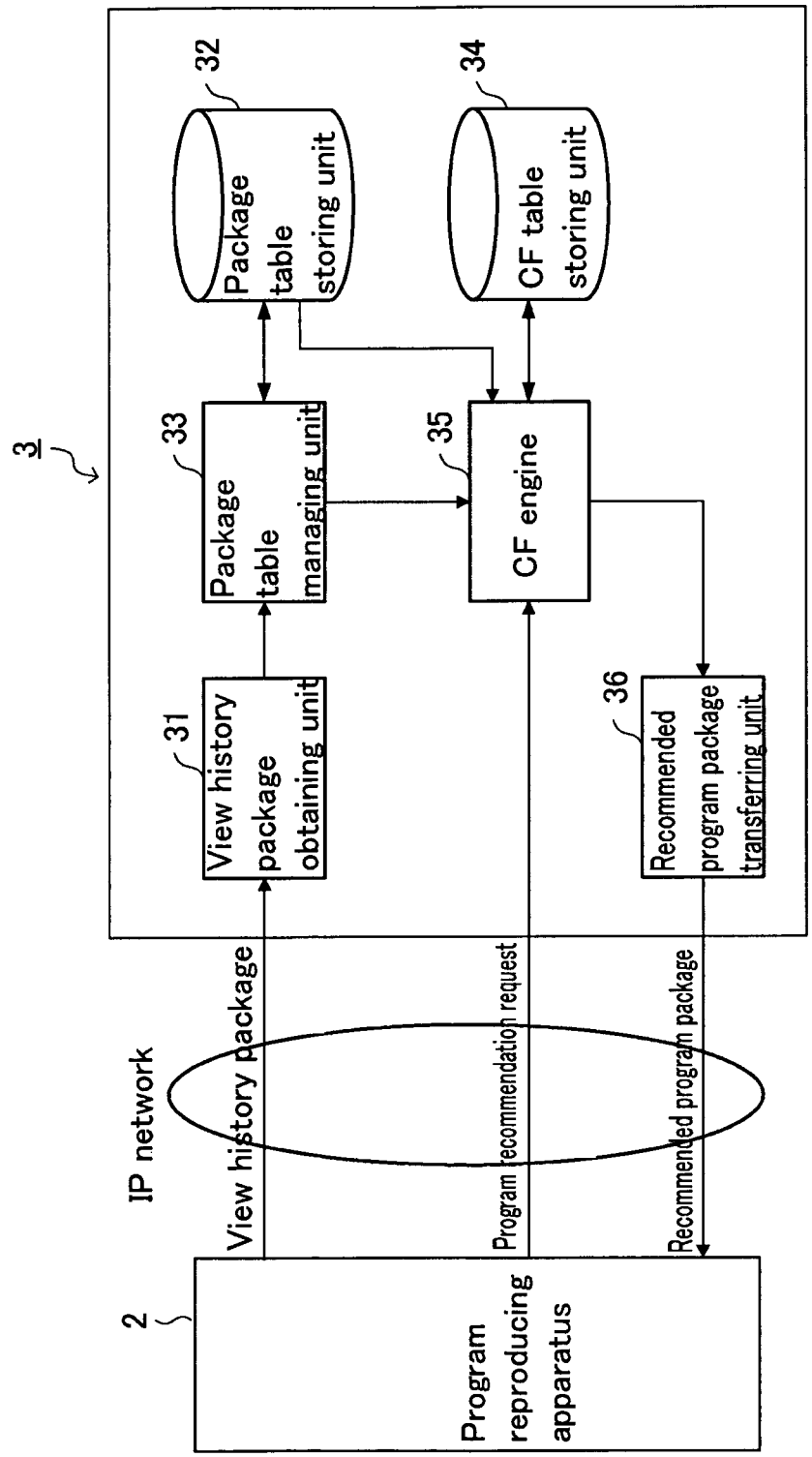
FIG. 4 is a block diagram showing a functional structure for the program recommendation service by a recommending server of FIG. 1.

FIG. 4 is a block diagram showing a functional structure for the program recommendation service by the recommending server 3.

As shown in FIG. 4, the recommending server 3 includes, as a functional structure for the program recommendation service, a view history package obtaining unit (package obtaining unit), a package table storing unit 32 (first table storing unit), a package table managing unit 33 (package identifier generating unit, first table registering unit), a CF table storing unit 34 (second table storing unit), a CF engine 35 (second table registering unit, determining unit), a recommended program package transferring unit 36 (notifying unit), and the like.

The view history package obtaining unit 31 obtains the view history package from the plurality of program reproducing apparatuses 2 via the IP network, and transfers the view history package to the package table managing unit 33.

The package table storing unit 32 stores a package table (first table). The package table is a table in which information on a plurality of specific items, user-country information, and user ID included in the view history package obtained by the view history package obtaining unit 31, package ID, obtaining number, and the like are stored in correspondence with each other as one record. At least one record is stored in the table. Here, the package ID is an identifier (package identifier) uniquely allocated to a unique combination of information on a plurality of specific items and user-country information included in the view history package.

The package table managing unit 33 generates a package ID for identifying each unique combination of information on a plurality of specific items and user-country information included in the view history package supplied from the view history package obtaining unit 31. Further, the package table managing unit 33 extracts information on a plurality of specific items and a user ID from the view history package supplied from the view history package obtaining unit 31, and registers them in the package table so as to be in correspondence with the above-mentioned package ID. Further, the package table managing unit 33 supplies contents of a record whose obtaining number reaches a threshold in the package table stored in the package table storing unit 32, to the CF engine 35.

The CF table storing unit 34 stores a CF table (second table) registering at least one package ID as information corresponding to a program view history of each user of the program reproducing apparatus 2.

The CF engine 35 updates the CF table stored in the CF table storing unit 34 based on contents of the record supplied from the package table managing unit 33. More specifically, the CF engine 35 searches a record corresponding to the program view history of the corresponding user in the CF table based on the user ID in the record supplied from the package table managing unit 33, and adds the package ID included in the record supplied from the package table managing unit 33 to the record. Therefore, the combination of the package IDs registered in correspondence with the user ID in the CF table is updated, and the program view history of the user is updated.

Further, when the CF engine 35 receives a program recommendation request including a user ID from the program reproducing apparatus 2, the CF engine 35 refers to the CF table, calculates similarity of the combination of the package IDs of the program-recommendation-request-source-user and the combinations of the package IDs of other users, and determines another user of high similarity. The CF engine 35 determines at least one package ID being a difference between the combination of the package IDs of the program-recommendation-request-source-user and the combination of the package IDs of the determined other user. More specifically, the CF engine 35 determines, in the combination of the package IDs included in the record in the CF table corresponding to the user ID of the determined other user, package IDs other than the package IDs included in the record in the CF table corresponding to the user ID of the program-recommendation-request-source-user, as the above-mentioned difference. Further, the CF engine 35 packages information on a plurality of specific items and user-country information included in the record corresponding to the package ID in the package table as one recommended program package, and supplies the recommended program package to the recommended program package transferring unit 36.

The recommended program package transferring unit 36 transfers the recommended program package supplied from the CF engine 35 to the program reproducing apparatus 2 of the program-recommendation-request-source-user via the IP network.

(Information on a Plurality of Specific Items and User-Country Information)

The program information includes information on a plurality of items such as a program ID, title, information on broadcast date and time, and program contents, and is used to identify a program being broadcasted or a program to be broadcasted by a user or a computer. The program information is multiplexed as SI (Service Information), an EIT (Event Information Table), or the like with the transport stream of a broadcast program, and broadcasted/delivered. In the information on a plurality of items structuring the program information, for example, title, program contents, and the like may include information whose secondary use is limited by its intellectual property rights such as trademark rights or copyrights. Therefore, in a case of exchanging such information between the program reproducing apparatus 2 and the recommending server 3, it is predicted that actual introduction of the system is greatly hampered because, for example, licenses of secondary use should be issued by right holders in the world.

Meanwhile, secondary use of information such as a program ID and information on broadcast date and time is not limited by its intellectual property right. However, each piece of information is not enough to identify a program constitutionally. For example, a program ID is an identifier uniquely allocated to each program in conformity with a broadcast standard, and the uniqueness of the program ID is only ensured in one country or territory. Therefore, in a case where service targets are a plurality of countries or territories whose broadcast standards are different from each other, it is impossible to identify a program with only a program ID.

In view of the above, the program recommendation system of this embodiment uses a combination of information on a plurality of previously-determined specific items never including, as contents, information whose secondary use is limited by its intellectual property right in program information, as information for identifying a program. More specifically, information on a plurality of previously-determined specific items at least including an item of a program ID and an item of information on broadcast date and time is used. A reason for using information on at least the two items of the program ID and the information on broadcast date and time is as follows. In a case where the target area of the program recommendation service is enlarged to a plurality of countries and territories whose broadcast standards are different from each other, there is a possibility that a plurality of different programs of the same program ID coexist, but there is little probability that the broadcast date and time of the plurality of programs is the same. According to the program recommendation system of this embodiment, without using information whose secondary use may be limited by its intellectual property right, the target area of the program recommendation service is enlarged to a plurality of countries and territories whose broadcast standards are different from each other, and generation of a predetermined restriction on program identify accuracy and recommended program estimation accuracy is accepted.

Further, the program information includes, in addition to the program ID and information on broadcast date and time, many pieces of information on items never including, as contents, information whose secondary use is limited by its intellectual property right. Information on at least one item in information on the plurality of items may be combined with the program ID and information on broadcast date and time, to be used. Larger the number of information to be combined, the program identify accuracy and the recommended program estimation accuracy may be increased.

In order to further increase the program identify accuracy and the recommended program estimation accuracy, not only information on a plurality of specific items in the program information, but also user-country information previously set to the program reproducing apparatus 2 may be used.

Further, the combination of the program ID and the user-country information may be used. In this case also, the program recommendation service targeting a plurality of countries and territories whose broadcast standards are different from each other may be performed well. However, the following problem may occur. That is, there is a possibility that a plurality of different programs to which the same program ID is allocated exist in one country or territory. This is because a method of reusing IDs in a case where types of IDs have run dry, and a rule of, in a case of rebroadcasting an old program, using a program ID previously allocated to the program as it is or newly reallocating a program ID are not internationally-standardized, and the like. If, in a case where program IDs have run dry, IDs are reused from the default, and if, in a case of rebroadcasting an old program, a program ID previously allocated to the program is used as it is, there is a high possibility that a plurality of different programs to which the same program ID is allocated coexist. Therefore, in such a case, there is fear that a program identify error might generate. However, according to the program recommendation system of this embodiment, without using information whose secondary use may be limited by its intellectual property right, the target area of the program recommendation service is enlarged to a plurality of countries and territories whose broadcast standards are different from each other, and generation of a predetermined restriction on program identify accuracy and recommended program estimation accuracy is accepted.

As a specific example of information on a plurality of specific items in the program information, a case where program information on DVB (European broadcast standard) is targeted will be described.

The DVB program information includes information on a plurality of items such as title, broadcast station name, staff/cast information, program details, program ID, broadcast start time, program length, genre, video image/audio information, rating, and the like. Here, the program ID is structured by network_id, transport_stream_id, service_id, event_id, and the like. Of those, the network_id, transport_stream_id, and service_id are identifiers for identifying a program offering target. Event_id is an identifier for identifying a program. The broadcast start time (start_time) is information on time that broadcasting of a program is started (local time of a territory where the broadcast station exists). The program length (duration) is a length of a program broadcast time period. The genre (content_nibble_level_1/2) is information indicating a program genre. The video image/audio information (component_type) is information indicating the kind of video image data (number of scanning lines, aspect ratio, and the like), the kind of audio data (monaural/stereo), and the like. The rating is information on a parental lock.

In the information on the above-mentioned items, the items of title, broadcast station name, and staff/cast information may include, as contents, information whose secondary use is limited by their intellectual property rights. Meanwhile, the items of program ID, broadcast start time, program length, genre, video image/audio information, and rating never include, as contents, information whose secondary use is limited. Note that, the broadcast start time corresponds to information on the above-mentioned broadcast date and time. Therefore, in a case of DVB also, the combination of information on a plurality of specific items including at least two items of program ID and broadcast start time may be used as information for identifying a program.

Next, operations of the system of this embodiment will be described.

(Generation/Transfer of View History Package)

Figure 5:
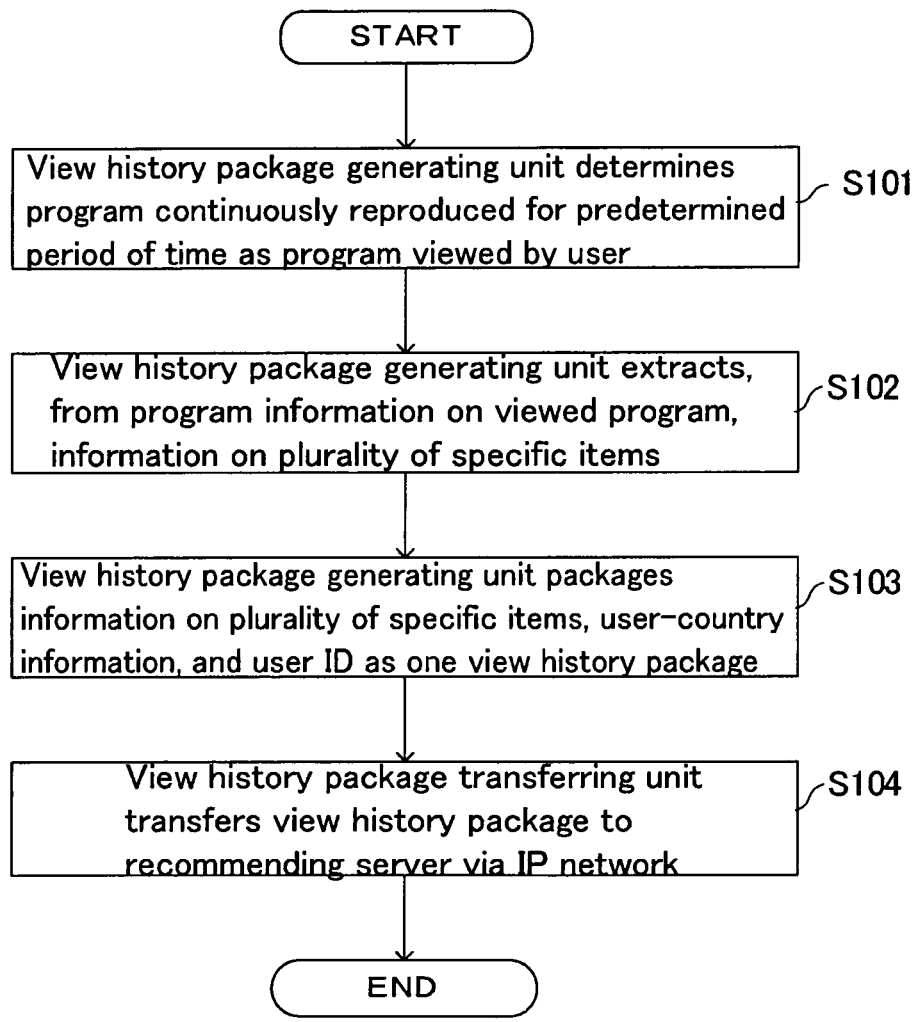
FIG. 5 is a flowchart showing operation steps of generating/transferring a view history package by the program reproducing apparatus of FIG. 1.

FIG. 5 is a flowchart showing operation steps of generating/transferring a view history package by the program reproducing apparatus 2.

Note that, in the operations, the combination of information on the items of program ID, broadcast start time, program length, genre, video image/audio information, and rating in the DVB program information and user-country information is used as information for identifying a program.

The program reproducing apparatus 2 performs the following operation to accept the program recommendation service offered by the recommending server 3.

(Step S101) First, the view history package generating unit 254 of the program reproducing apparatus 2 determines a program that the broadcast signal processing unit 21 continuously reproduces, for example, for a predetermined period of time, as a program viewed by a user. Here, the predetermined period of time is a time period with which actual view is distinguished from zapping of selecting a program by a user (for example, a few minutes).

(Step S102) Determining program view by a user, the view history package generating unit 254 extracts, from program information on the viewed program stored in the program information storing unit 252, information on the items of program ID, broadcast start time, program length, genre, video image/audio information, and rating, as information on a plurality of specific items.

(Step S103) Next, the view history package generating unit 254 packages the extracted information on the plurality of specific items, and the user-country information and the user ID previously stored in the user-country information/user ID storing unit 253, as one view history package, and supplies the view history package to the view history package transferring unit 255.

(Step S104) Receiving the view history package, the view history package transferring unit 255 transfers the view history package to the recommending server 3 via the IP network.

The above-mentioned generation and transfer of a view history package may be performed, as described above, every time a program viewed by a user is determined. Alternatively, information capable of internally and uniquely identifying a program viewed by a user may be stored, and generation and transfer of a view history package may be time-periodically performed in a batch.

(Management of Program View History for Each User)

The recommending server 3 identifies a program based on the combination of information on a plurality of specific items and user-country information included in the view history package obtained from the program reproducing apparatus 2. The recommending server 3 generates a package ID with regard to the combination of the information, and registers, based on the user ID included in the view history package, the package ID in the CF table for storing a program view history for each user. Hereinafter, management of a program view history for each user by the recommending server 3 will be described in detail.

Figure 6:
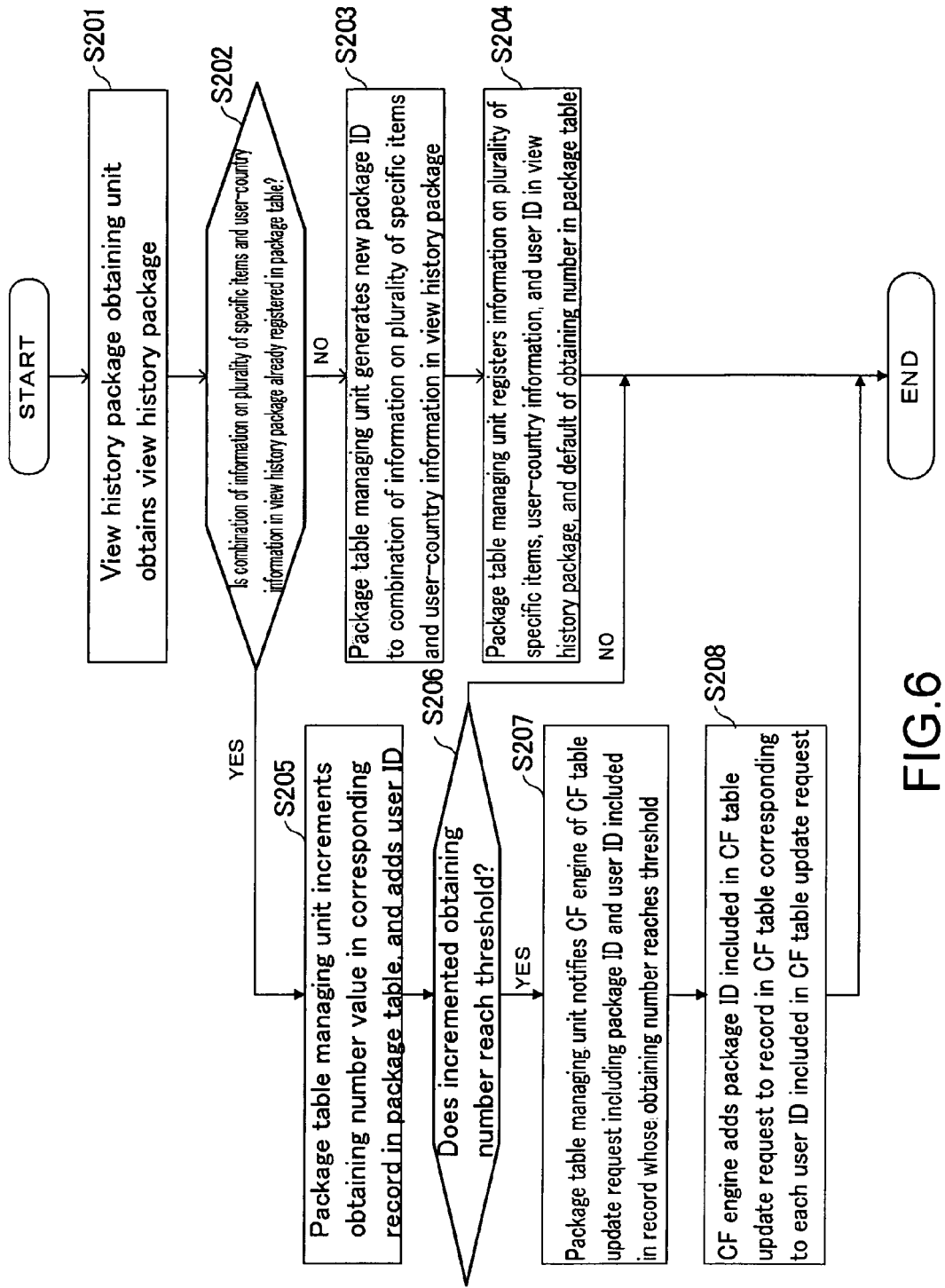
FIG. 6 is a flowchart showing steps of managing a view history for each user by the recommending server.

FIG. 6 is a flowchart showing steps of managing a view history for each user by the recommending server 3.

(Step S201) First, the view history package obtaining unit 31 obtains a view history package transferred to the recommending server 3 from one of the program reproducing apparatuses 2 via the IP network. The view history package obtaining unit 31 supplies the obtained view history package to the package table managing unit 33.

Receiving the view history package from the view history package obtaining unit 31, the package table managing unit 33 updates the package table stored in the package table storing unit 32 as follows.

FIG. 7 shows an example of the package table. As shown in FIG. 7, the package table is a table in which information on a plurality of specific items and user-country information extracted from the view history package, package ID, obtaining number, user ID, and the like are stored in correspondence with each other as one record. At least one record is stored in the table. The package ID is an identifier uniquely allocated to a unique combination of information on a plurality of specific items and user-country information. The obtaining number is a count number of an obtaining value of the view history package for each package ID. The user ID is a user ID included in the view history package. Note that, in FIG. 7, "***" shows any registered information. The user ID may be managed by another table in correspondence with the package ID.

(Step S202) The package table managing unit 33 determines, in order to secure uniqueness of the combination of information on the plurality of specific items and user-country information in each record registered in the package table, if the combination of information on the plurality of specific items and user-country information included in the obtained view history package is already registered in the package table.

(Step S203) In a case where the combination of information on the plurality of specific items and user-country information included in the view history package is not registered in the package table, the package table managing unit 33 generates a new package ID with regard to the combination of information on the plurality of specific items and user-country information included in the view history package supplied from the view history package obtaining unit 31.

(Step S204) Subsequently, the package table managing unit 33 registers information on a plurality of specific items, user-country information, and user ID included in the view history package supplied from the view history package obtaining unit 31 in correspondence with the above-mentioned new package ID in the package table as a new record. Further, the package table managing unit 33 sets "1" being a default as the obtaining number in the new record. Here, the processing of obtaining a view history package is finished.

(Step S205) Further, the following is an operation in a case where the combination of information on a plurality of specific items and user-country information included in the view history package is already registered in any record in the package table. In this case, the package table managing unit 33 increments the obtaining number value in the data package record. Further, the package table managing unit 33 adds the user ID included in the view history package to the record. Note that, in a case where the same user ID is already registered, increment of the obtaining number value is only performed.

(Step S206) Subsequently, the package table managing unit 33 determines if the incremented obtaining number reaches a threshold. In a case where the incremented obtaining number does not reach the threshold, the processing of obtaining a view history package is finished.

(Step S207) In a case where the incremented obtaining number reaches the threshold, the package table managing unit 33 retrieves package IDs and user ID (all user IDs in records) included in the record whose obtaining number reaches the threshold, and notifies the CF engine 35 of a CF table update request including them.

(Step S208) Receiving the CF table update request, the CF engine 35A adds the package ID included in the CF table update request to the record in the CF table corresponding to each user ID included in the CF table update request.

FIG. 8 shows an example of the CF table. As shown in FIG. 8, the CF table is a table capable of registering a plurality of package IDs as information corresponding to a program view history for each of the users of the plurality of the program reproducing apparatuses 2 capable of accepting the service offered by the recommending server 3. Note that, in FIG. 8, "--" shows a package ID unregistered area. In the CF table, for example, three package IDs=1, 10, and 12 correspond to the user ID=1. The combinations of the three package IDs are information corresponding to a program view history of the user.

A specific example of updating the CF table will be described.

Here, the recommending server 3 assumes that the combination of information on a plurality of specific items and user-country information included in the view history package obtained from the program reproducing apparatus 2 of a user (user ID=1) coincides with the combination of information included in the record of the package ID=23 included in the package table of FIG. 7. Then, a case where, as the result of incrementing the obtaining number value in the record, the obtaining number value reaches the threshold (in this example, 100,000) is assumed. Receiving a CF table update request including the package ID (=23) and the user ID (=1, 4) included in the record whose obtaining number reaches the threshold from the package table managing unit 33, the CF engine 35 updates the CF table. For example, in a case where the unupdated CF table is as shown in FIG. 8, the package ID (=23) is added to each record corresponding to the user ID (=1, 4) in the CF table, whereby the updated CF table is as shown in FIG. 9.

(Estimation of Recommended Program)

In the CF table, a plurality of users whose combinations of package IDs are similar to each other have program view histories similar to each other. Therefore, there is a high validity that a program viewed by only part of users of a plurality of users having the similar program view histories is a recommended program for other users. From the above-mentioned viewpoint, the recommending server 3 estimates a recommended program as follows.

Figure 10:
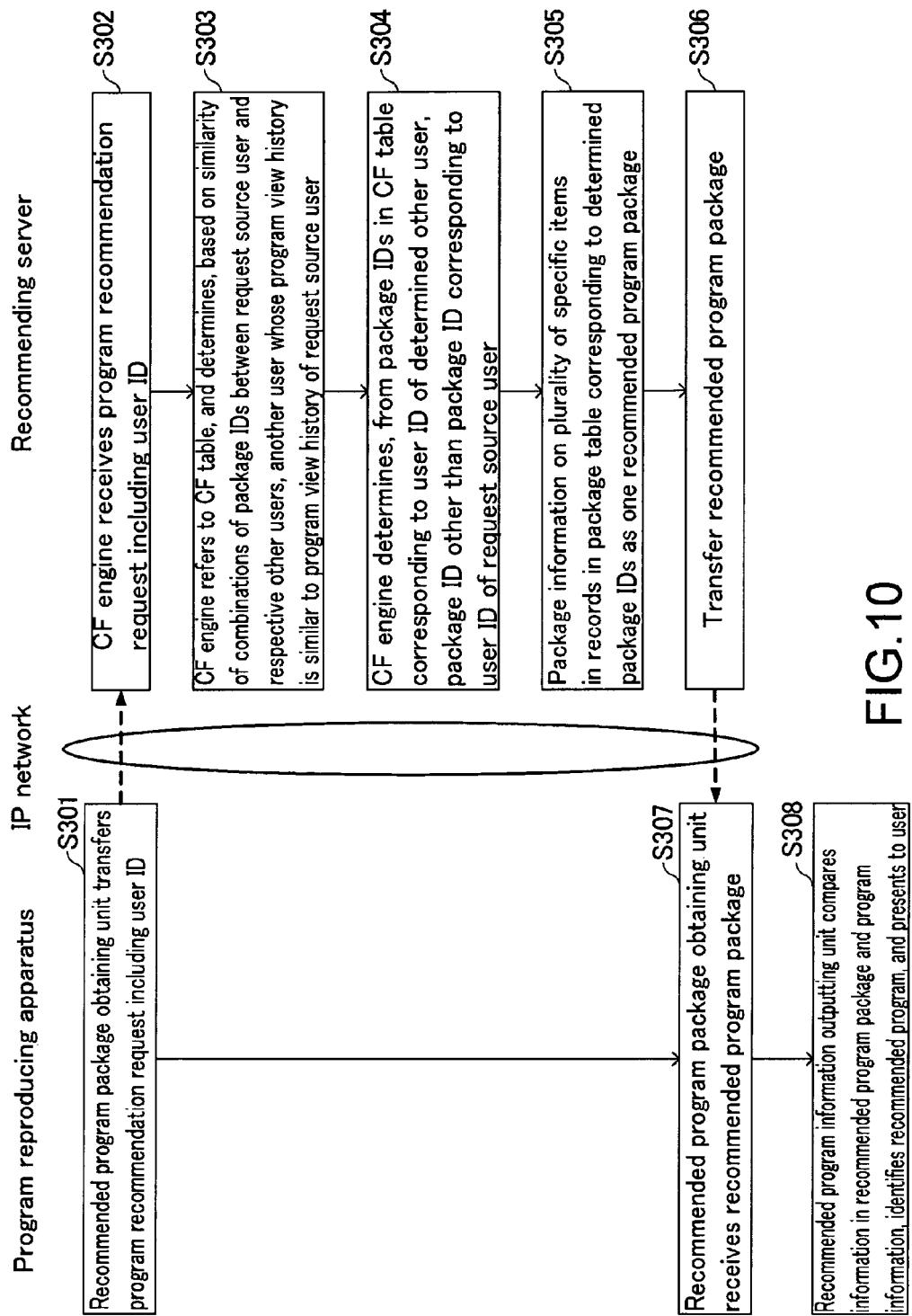
FIG. 10 is a flowchart showing steps of an operation of estimating a recommended program by the recommending server of FIG. 1.

FIG. 10 is a flowchart showing steps of an operation of estimating a recommended program by the recommending server 3.

(Step S301) The recommended program package obtaining unit 256 of the program reproducing apparatus 2 transfers a program recommendation request including a user ID to the recommending server 3 via the IP network.

(Step S302) The CF engine 35 of the recommending server 3 receives the program recommendation request including the user ID transferred from the program reproducing apparatus 2.

(Step S303) Receiving the program recommendation request including the user ID, the CF engine 35 refers to the CF table, and determines, based on the similarity of the combinations of package IDs between a request source user and respective other users, another user whose program view history is similar to the program view history of the request source user.

A specific example of the operation will be described. For example, it is assumed that the CF engine 35 of the recommending server 3 receives a program recommendation request from the program reproducing apparatus 2 of a user of user ID=1. The state of the CF table in this case is as shown in FIG. 9. The CF engine 35 obtains similarity of the combination of package IDs of the request source user (user ID=1) in the CF table and the combinations of package IDs of the respective users other than the request source user in the CF table. Making it simple, here, a case of obtaining similarity of six users having user ID=1 to 6 in the CF table of FIG. 9 will be described. Note that, there are various methods as specific calculation methods of similarity. The specific calculation methods include, for example, a method based on the number of coincided package IDs, a method based on a ratio of the number of coincided package IDs, and the like are. Here, a case where similarity is obtained based on the number of coincided package IDs, and another user whose program view history is similar to a program view history of a request source user will be described.

The numbers of coincided package IDs between the combination of the package IDs (1, 10, 12, 23) corresponding to user ID=1 of the request source user and the combinations of the package IDs of other users are examined:

the coincided number with the user of user ID=2 is 1;
the coincided number with the user of user ID=3 is 0;
the coincided number with the user of user ID=4 is 3;
the coincided number with the user of user ID=5 is 0; and
the coincided number with the user of user ID=6 is 0.

Here, in a case where criteria for determining another user having a similar program view history are that the number of coincided package IDs is 3 or more and the largest, a user of user ID=4 is determined as another user having a program view history similar to the program view history of the request source user. Therefore, a plurality of other users having program view histories similar to the program view history of the request source user may be determined.

(Step S304) After other users having program view histories similar to the program view history of the request source user are determined as described above, the CF engine 35 determines, for each of the determined other users, from a plurality of package IDs corresponding to the user ID of each user, package IDs other than the package IDs corresponding to the user ID of the request source user. For example, in the above-mentioned operation example, it is determined that one user of user ID=4 is determined as another user having a program view history similar to the program view history of the request source user. Here, as shown in FIG. 9, since a plurality of package IDs corresponding to user ID=4 are "10", "12", "19", and "23", and package IDs corresponding to user ID=1 of the request source user are "1", "10", "12", and "23", package ID=19 is obtained as the result of determination. Note that, the kinds of package ID being a determination result is not limited to one, but a plurality of package IDs may be obtained. Further, in a case where there are a plurality of other users having program view histories similar to the program view history of the request source user, the CF engine 35 obtains the sum of the determined package IDs in the user IDs of the respective other users as a conclusive determination result.

(Step S305) After that, the CF engine 35 packages information on a plurality of specific items included in the records in the package table corresponding to the determined package IDs, to thereby produce a recommended program package. Therefore, a recommended program package in which information on programs having a high possibility that the programs fit the program view history of the request source user and are not viewed by the request source user yet are organized into one is obtained.

(Step S306) The CF engine 35 supplies the generated recommended program package to the recommended program package transferring unit 36. The recommended program package transferring unit 36 transfers the recommended program package supplied from the CF engine 35 to the program reproducing apparatus 2 of the request source user via the IP network.

(Step S307) The recommended program package obtaining unit 256 of the program reproducing apparatus 2 obtains the recommended program package transferred from the CF engine 35 of the recommending server 3, and supplies the recommended program package to the recommended program information outputting unit 257.

(Step S308) The recommended program information outputting unit 257 compares information on a plurality of specific items included in the recommended program package and program information stored in the program information storing unit 252, identifies a recommended program, and presents program information on the identified recommended program to the user through the display unit 22. In this case, the presented program information may include, in addition to program ID and information on broadcast date and time, information whose secondary use is limited by its intellectual property right such as title, broadcast station name, and program contents. That is, displaying the information is primary use of program information stored of the program reproducing apparatus 2.

As a method of displaying program information on a recommended program by the display unit 22, for example, in a case where there is an information display area for navigating program tuning or apparatus operation by a user other than an area for displaying a program tuned by a user on the screen of the display unit 22, program information on a recommended program may be displayed on the information display area. Alternatively, program information on the recommended program may be displayed in an area for displaying a program tuned by a user in an overlapped manner.

As described above, according to this embodiment, without exchanging information on items which may include information whose secondary use is limited by its intellectual property right such as, for example, title, broadcast station name, and staff/cast information in the program information, between the information the program reproducing apparatus 2 and the recommending server 3, the program recommendation service targeting a plurality of countries and territories whose broadcast standards are different from each other is well performed.

Further, according to this embodiment, since, in the package table, the CF table is updated with regard to the package ID and user ID included in the record whose obtaining number reaches the threshold, the number of updating the CF table is reduced to thereby reduce the load of processing, and registering a package ID corresponding to a combination of information on a plurality of specific items, which is ungeneratable under normal circumstances, in the CF table in error is avoided. Therefore, reliability of the program recommendation service is improved.

Second Embodiment

Next, a second embodiment according to the present invention will be described.

In the first embodiment, when the CF engine 35 of the recommending server 3 receives a program recommendation request including a user ID from the program reproducing apparatus 2, the operation of estimating a recommended program is started. As a modified embodiment thereof, the recommending server 3 may automatically and time-periodically start the operation of estimating a recommended program.

Figure 11:
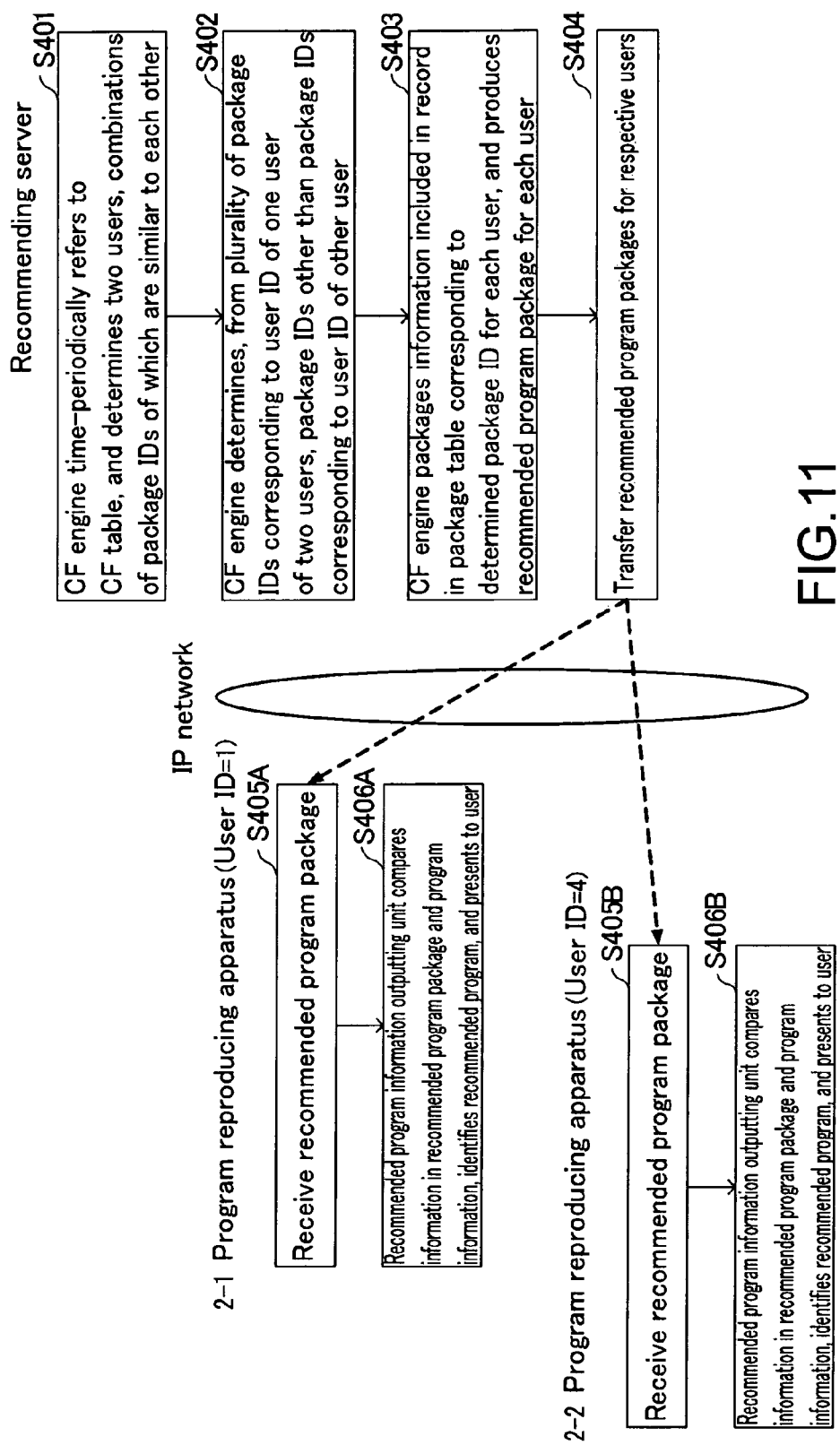
FIG. 11 is a flowchart showing steps of an operation of estimating a recommended program by a recommending server according to a second embodiment.

FIG. 11 is a flowchart showing steps of an operation of estimating a recommended program by the recommending server 3 according to the second embodiment.

(Step S401) The CF engine 35 time-periodically refers to the CF table, and determines two users, the similarity of combinations of package IDs of which reaches a threshold.

For, example, in a state where the CF table of FIG. 9 exists, the numbers of coincided package IDs between two users are:

1 between users of user IDs=1 and 2;
0 between users of user IDs=1 and 3;
3 between users of user IDs=1 and 4;
0 between users of user IDs=1 and 5;

0 between users of user IDs=1 and 6;
2 between users of user IDs=2 and 3;
0 between users of user IDs=2 and 4;
1 between users of user IDs=2 and 5;
0 between users of user IDs=2 and 6;
0 between users of user IDs=3 and 4;
1 between users of user IDs=3 and 5;
0 between users of user IDs=3 and 6;
0 between users of user IDs=4 and 5;
0 between users of user IDs=4 and 6; and
0 between users of user IDs=5 and 6.

In a case where a threshold is 3, users of user IDs=1 and 4 are determined as two users, the similarity of combinations of package IDs of which reaches a threshold.

(Step S402) Next, the CF engine 35 determines, with regard to the determined two users, package identifiers corresponding to programs recommended to the respective users based on a difference of the program view histories of the users. Specifically, the CF engine 35 determines, from a plurality of package IDs corresponding to a user ID of one user of the two users, package IDs other than package IDs corresponding to the other user. For example, in the above-mentioned example, the package IDs corresponding to user ID=1 are "1", "10", "12", and "23", and the package IDs corresponding to user ID=4 are "10", "12", "19", and "23". Therefore, package ID=19 is determined to the user of user ID=1, and package ID=1 is determined to the user of user ID=4.

(Step S403) After that, the CF engine 35 packages information on a plurality of specific items included in a record in the package table corresponding to the determined package ID for each user, and produces a recommended program package for each user. The CF engine 35 requests the recommended program package transferring unit 36 to transfer recommended program packages for the respective users to the program reproducing apparatuses 2 (the program reproducing apparatuses 2-1, 2-2 in FIG. 11) of the corresponding users.

(Step S404) According to the request from the CF engine 35, the recommended program package transferring unit 36 transfers recommended program packages for respective users to the program reproducing apparatuses 2 (program reproducing apparatuses 2-1, 2-2) of the corresponding users via the IP network.

(Step S405A, S405B) Similar to the first embodiment, the recommended program package obtaining unit 256 in each of the program reproducing apparatuses 2 (2-1, 2-2) obtains a recommended program package transferred from the CF engine 35 of the recommending server 3, and supplies the recommended program package to the recommended program information outputting unit 257.

(Step S406A, S406B) In each of the program reproducing apparatuses 2 (2-1, 2-2), the recommended program information outputting unit 257 compares information on a plurality of specific items included in the recommended program package and program information stored in the program information storing unit 252, identifies a recommended program, and presents program information on the identified recommended program to the user through the display unit 22.

For example, in the above-mentioned example, in a case where a user of the program reproducing apparatus 2-1 is a user of user ID=1, program information on the recommended program is presented to the user of the program reproducing apparatus 2-1 where the recommended program is a program corresponding to package ID=19 in the package table. Similarly, in a case where a user of the program reproducing apparatus 2-2 is a user of user ID=4, program information on the recommended program is presented to the user of the program reproducing apparatus 2-2 where the recommended program is a program corresponding to package ID=1 in the package table.

As described above, according to the second embodiment, without depending on a program recommendation request from the program reproducing apparatuses 2 (2-1, 2-2), the recommending server 3 is capable of time-periodically and automatically determining two users, the similarity of combinations of package IDs of which reaches a threshold, and transferring a recommended program package to each of the program reproducing apparatuses 2 (2-1, 2-2) of respective users.

Third Embodiment

Next, a third embodiment according to the present invention will be described.

In the above-mentioned first embodiment, the recommending server 3 transfers a recommended program package including information on a plurality of specific items in program information as a program recommendation result to the program reproducing apparatus 2, and the program reproducing apparatus 2 compares information on the plurality of specific items included in the recommended program package and program information stored in the program information storing unit 252, to thereby identify a recommended program. In the third embodiment, the recommending server 3 also identifies a recommended program.

(Structure of Program Reproducing Apparatus 2a)

Figure 12:
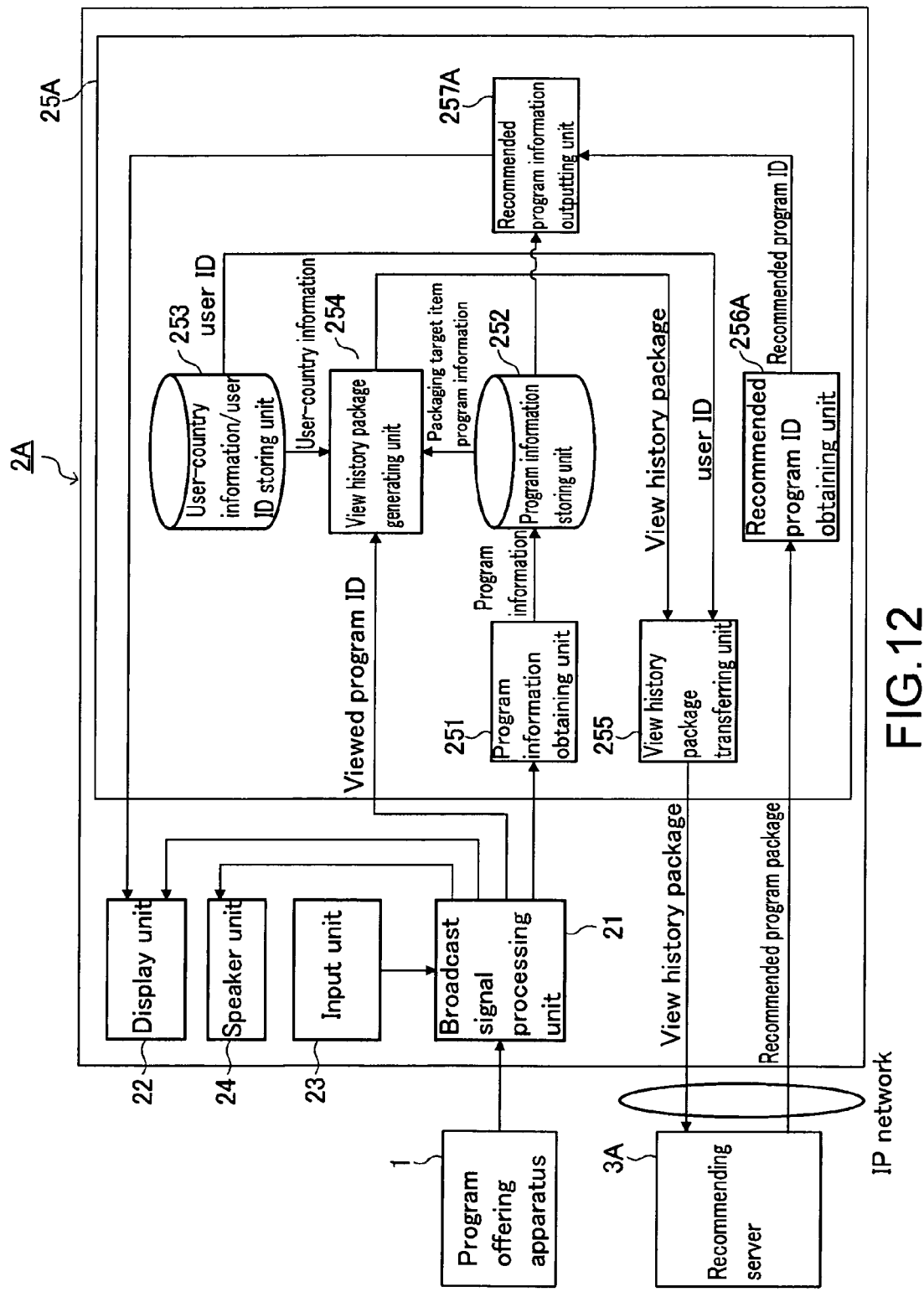
FIG. 12 is a diagram showing the structure of a program reproducing apparatus according to a third embodiment.

FIG. 12 is a diagram showing the structure of a program reproducing apparatus 2A according to the third embodiment.

As shown in FIG. 12, the program reproducing apparatus 2A includes the broadcast signal processing unit 21, the display unit 22, the input unit 23, the speaker unit 24, and a program recommendation processing unit 25A. The structure other than the structure of the program recommendation processing unit 25A is similar to that of the program reproducing apparatus 2 of the first embodiment. The program recommendation processing unit 25A includes the program information obtaining unit 251, the program information storing unit 252, the user-country information/user ID storing unit 253, the view history package generating unit 254, the view history package transferring unit 255, a recommended program ID obtaining unit 256A, and a recommended program information outputting unit 257A. Here, the structure other than the structure of the recommended program ID obtaining unit 256A and the recommended program information outputting unit 257A is similar to that of the program recommendation processing unit 25 of the first embodiment, so the description thereof will be omitted.

The recommended program ID obtaining unit 256A transfers a program recommendation request including a user ID and user-country information to the recommending server 3 via the IP network, obtains a program ID of a recommended program as a program recommendation result from a recommending server 3A as the response, and supplies the program ID to the recommended program information outputting unit 257A.

The recommended program information outputting unit 257A extracts, based on a program ID of a recommended program supplied from the recommended program ID obtaining unit 256A, program information on the corresponding program from the program information storing unit 252, and presents the program information to a user via the display unit 22.

(Structure of Recommending Server 3a)

Figure 13:
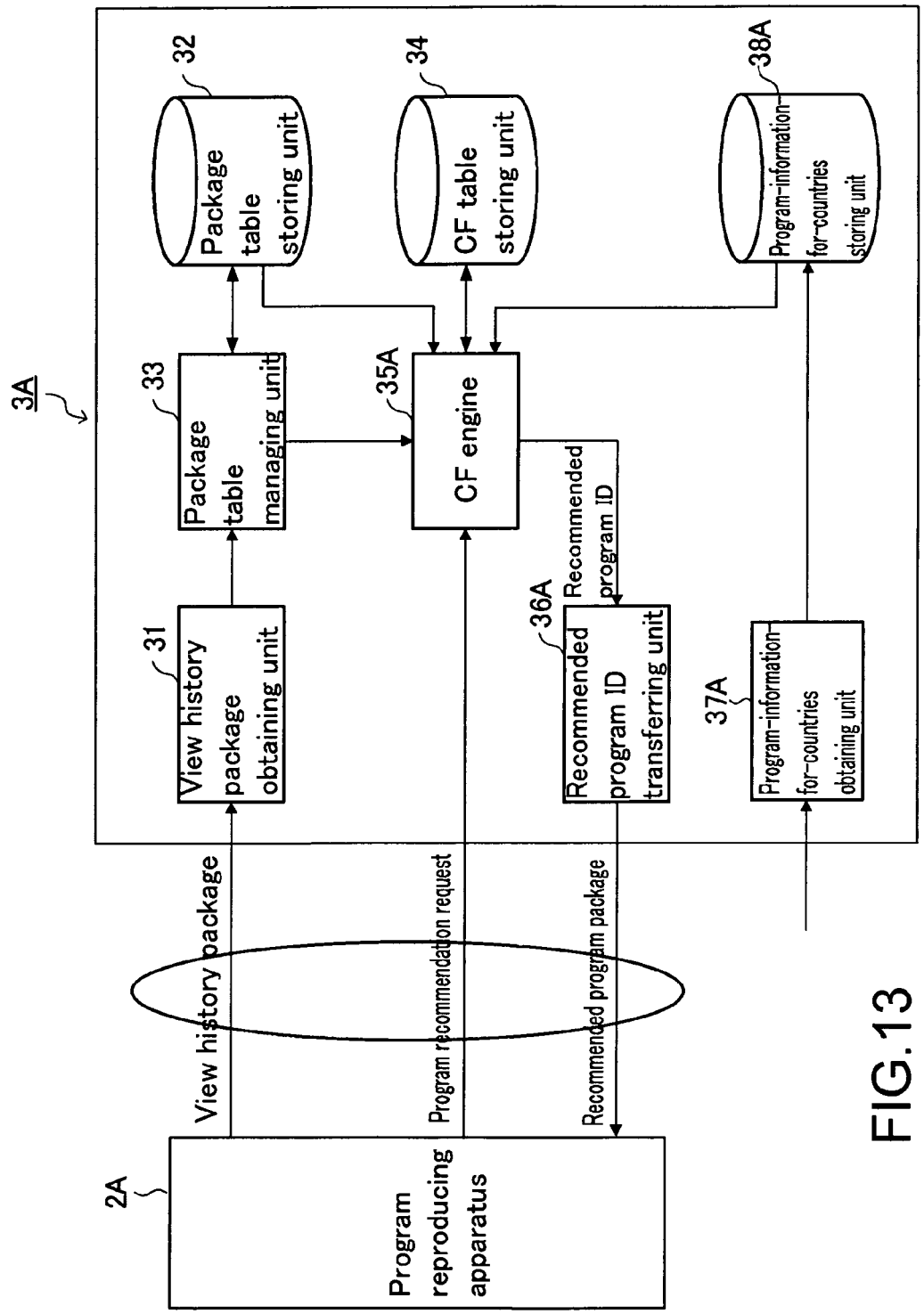
FIG. 13 is a block diagram showing a functional structure for the program recommendation service of a recommending server according to the third embodiment.

FIG. 13 is a block diagram showing a functional structure for the program recommendation service of the recommending server 3A.

As shown in FIG. 13, the recommending server 3A includes, as the functional structure for the program recommendation service, the view history package obtaining unit 31, the package table storing unit 32, the package table managing unit 33, the CF table storing unit 34, a CF engine 35A, a recommended program ID transferring unit 36A, a program-information-for-countries obtaining unit 37A, a program-information-for-countries storing unit 38A, and the like.

The program-information-for-countries obtaining unit 37A obtains program information in all the countries/territories in a service target area via transmission media such as broadcast waves and the IP network, and causes the program-information-for-countries storing unit 38A to store the program information. The program-information-for-countries storing unit 38A stores program information in each of the countries/territories obtained by the program-information-for-countries obtaining unit 37A in correspondence with country/territory information.

The CF engine 35A determines another user having a program view history similar to that of a program-recommendation-request-source-user, and determines, in package IDs included in a record in a CF table corresponding to a user ID of the determined other user, package IDs other than the package IDs included in the record in the CF table corresponding to a user ID of the program-recommendation-request-source-user. Further, the CF engine 35A determines, based on user-country information included in a program recommendation request, in program information on respective countries/territories stored in the program-information-for-countries storing unit 38A in correspondence with country/territory information, program information on the corresponding country/territory. Then, the CF engine 35A compares information on a plurality of specific items in a record corresponding to the above-mentioned determined package ID and the above-mentioned determined program information, to thereby determine their consistency, and supplies, in a case where consistency is ensured, only program ID in information on a plurality of specific items to the recommended program ID transferring unit 36A.

The recommended program ID transferring unit 36A transfers the program ID supplied from the CF engine 35A to the program reproducing apparatus 2A of a request source user via the IP network as a program ID of a recommended program.

Operation of Third Embodiment

Next, an operation of the third embodiment will be described.

Generating/transferring a view history package by the program reproducing apparatus 2A is similar to that of the first embodiment, so the description will be omitted.

Managing a program view history for each user by the recommending server 3A is similar to that of the first embodiment, so the description will be omitted.

An operation of estimating a recommended program by the recommending server 3A according to this embodiment is as follows.

Figure 14:
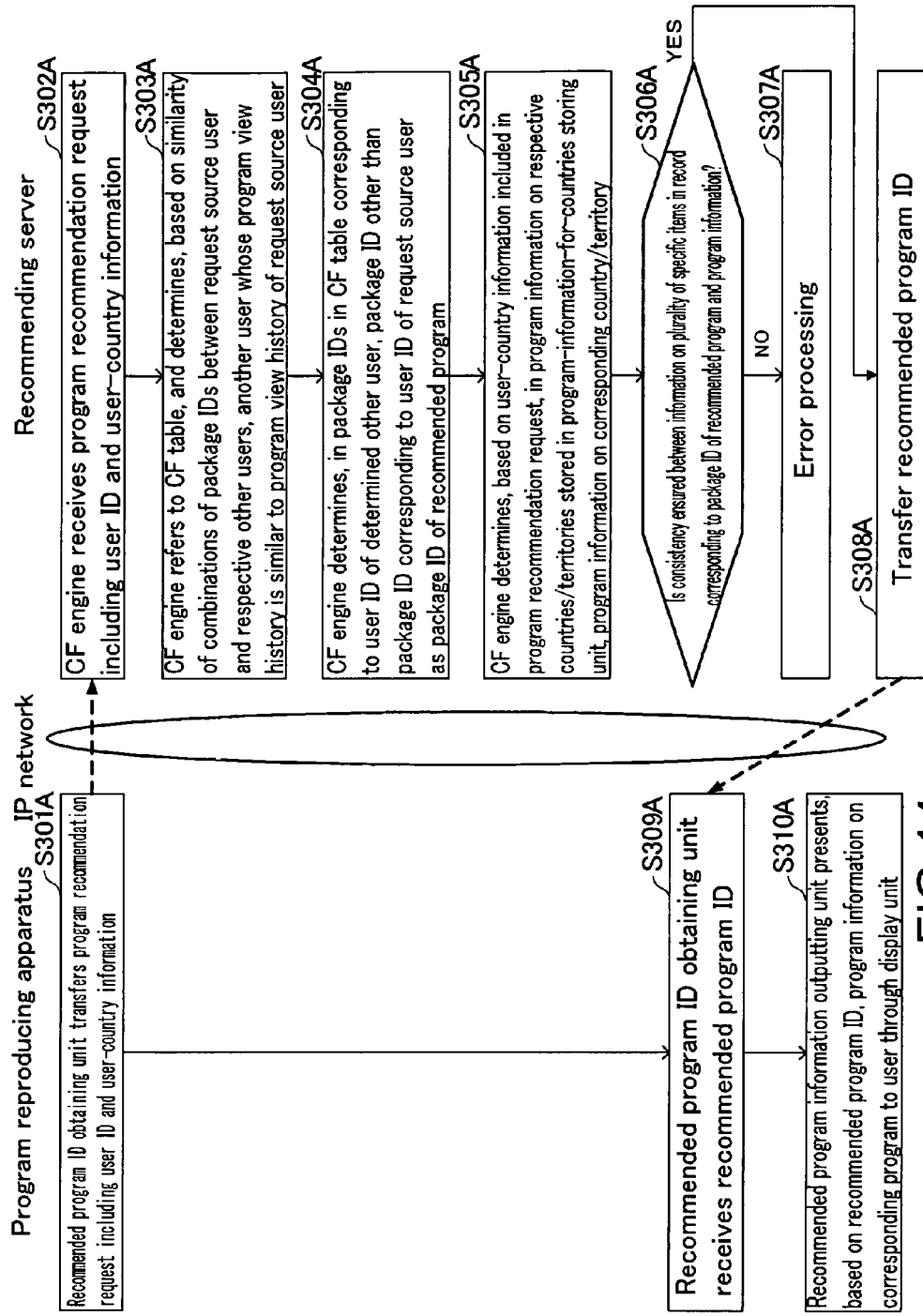
FIG. 14 is a flowchart showing steps of an operation of estimating a recommended program by the recommending server according to the third embodiment.

FIG. 14 is a flowchart showing steps of an operation of estimating a recommended program by the recommending server 3A.

(Step S301A) The recommended program ID obtaining unit 256A of the program reproducing apparatus 2A transfers a program recommendation request including a user ID and user-country information to the recommending server 3A via the IP network.

(Step S302A) The CF engine 35A of the recommending server 3A receives the program recommendation request including a user ID and user-country information transferred from the program reproducing apparatus 2A.

(Step S303A) Receiving the program recommendation request including a user ID and user-country information, the CF engine 35A refers to a CF table, and determines, based on the similarity of the combinations of package IDs between a request source user and respective other users, another user whose program view history is similar to the program view history of the request source user.

(Step S304A) Next, the CF engine 35A determines, for each determined user, from a plurality of package IDs corresponding to a user ID of the user, a package ID other than a package ID corresponding to a user ID of the request source user as a package ID of a recommended program.

(Step S305A) After that, the CF engine 35A determines, based on user-country information included in the program recommendation request, from program information on the respective countries/territories stored in the program-information-for-countries storing unit 38A, program information on the corresponding country/territory.

(Step S306A) Next, the CF engine 35A compares information on a plurality of specific items in a record corresponding to package ID of a recommended program determined in Step S304A and program information on a country/territory determined in Step S305A, to thereby determine their consistency.

(Step S307A) In a case where consistency is not ensured, the CF engine 35A finishes the processing as a program recommendation determination error.

(Step S308A) In a case where consistency is ensured, the CF engine 35A supplies only a program ID in information on a plurality of specific items to the recommended program ID transferring unit 36A. The recommended program ID transferring unit 36A transfers the recommended program ID supplied from the CF engine 35A to the program reproducing apparatus 2A of the request source user via the IP network.

(Step S309A) The recommended program ID obtaining unit 256A of the program reproducing apparatus 2A obtains the recommended program ID transferred from the recommending server 3A, and supplies the recommended program ID to the recommended program information outputting unit 257A.

(Step 310A) The recommended program information outputting unit 257 extracts, based on a program ID of a recommended program supplied from the recommended program ID obtaining unit 256A, program information on the corresponding program from the program information storing unit 252, and presents the program information to a user through the display unit 22. In this case, the presented program information may include, in addition to program ID and information on broadcast date and time, information whose secondary use is limited such as title, broadcast station name, and program contents.

As described above, also according to this embodiment, without exchanging information on items which may include information whose secondary use is limited by their intellectual property rights such as, for example, title, broadcast station name, and staff/cast information in the program information, between the information the program reproducing apparatus 2A and the recommending server 3A, the program recommendation service by the recommending server 3A is well performed.

Modified Example 1

Note that, in the above-mentioned third embodiment, the program-information-for-countries storing unit 38A stores country/territory information in correspondence with program information, and the country/territory information and user-country information included in a program recommendation request from the program reproducing apparatus 2A are compared. Alternatively, in a specification in which program information includes country/territory information, country/territory information included in the program information and user-country information included in a program recommendation request may be compared.

Modified Example 2

In the above-mentioned embodiments, the program reproducing apparatus supplies information on a plurality of specific items never including, as contents, information whose secondary use is limited by its intellectual property right in program information and user-country information to the recommending server, to thereby identify a program. However, as described in (Information on a plurality of specific items and user-country information), the program reproducing apparatus may supply only information on a plurality of specific items never including, as contents, information whose secondary use is limited by its intellectual property right to the recommending server, to thereby identify a program. Further, the program reproducing apparatus may supply only a program ID in program information and user-country information to the recommending server to thereby identify a program.

Modified Example 3

In the above-mentioned embodiments, the program reproducing apparatus packages information on a plurality of specific items in program information, user-country information, and a user ID into one view history package, and transfers the view history package to the recommending server. However, the present invention is not limited to this. The transferring timings of information on a plurality of specific items in program information, user-country information, and a user ID may not be the same. For example, in one communication session managing start, continuation, end, and the like of a series of communication, the program reproducing apparatus may transfer information on a plurality of specific items, user-country information, and a user ID to the recommending server. In this case, the program reproducing apparatus transfers a view history package only including information on a plurality of specific items to the recommending server. User-country information and a user ID are transferred before or after transferring the view history package. The recommending server registers information on a plurality of specific items, user-country information, and a user ID obtained from the program reproducing apparatus in one communication session in the package table in correspondence with each other.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a package obtaining unit to obtain, from at least one program reproducing apparatus, the at least one program reproducing apparatus being configured to obtain program information including information on a plurality of items for each broadcast program, to selectively receive and reproduce the broadcast program, and to transfer a package including information on a plurality of previously-determined specific items failing to include, as a content, information whose secondary use is limited by an intellectual property right, in the program information on a program viewed by a user, the package;
a first table storing unit to store a first table;
a package identifier generating unit to generate, for each unique combination of information on the plurality of specific items included in the obtained package, a package identifier identifying the combination;
a first table registering unit to extract information on the plurality of specific items from the obtained package, and to register the information on the plurality of specific items, a user identifier identifying a user of a program reproducing apparatus being a transfer source of the package, and the generated package identifier in correspondence with each other, in the first table;
a second table storing unit to store a second table;
a second table registering unit to extract a correspondence relation between the user identifier and the package identifier from the first table, and to register the at least one package identifier corresponding to the user identifier, as a program view history for each user, in the second table;
a determining unit to determine the at least one package identifier being a difference between a plurality of program view histories similar to each other registered in the second table; and
a notifying unit to notify a program reproducing apparatus of a recommendation-target-user of at least part of information on the plurality of specific items registered in the first table corresponding to the package identifier determined by the determining unit
in which the plurality of specific items in the program information at least includes (i) an item of a program identifier uniquely allocated to each program in conformity with a broadcast standard which excludes any identifier whose secondary use is limited by the intellectual property right, and (ii) an item of information on broadcast date and time.

2. The information processing apparatus according to claim 1, further comprising:
an obtaining number managing unit to manage an obtaining number of the package for each package identifier,
wherein the second table registering unit is to extract a correspondence relation between the package identifier of the package whose obtaining number reaches a threshold and the user identifier.

3. The information processing apparatus according to claim 2, wherein:
the determining unit to refer to the second table according to a program recommendation request including the user identifier from a program reproducing apparatus of a program-recommendation-request-source-user, and determine another user whose program view history is similar to the program view history of the program-recommendation-request-source-user, and
to determine, as the difference, at least one package identifier in the program view history of the other user, the at least one package identifier failing to be included in the program view history of the program-recommendation-request-source-user, and the notifying unit to notify the program reproducing apparatus of the program-recommendation-request-source-user of at least part of information on the plurality of specific items registered in the first table corresponding to the package identifier determined by the determining unit.

4. The information processing apparatus according to claim 3, wherein:

the package identifier generating unit to generate a package identifier identifying each unique combination of information on the plurality of specific items included in the obtained package and user-country information previously set to the program reproducing apparatus, and the first table registering unit to register information on the plurality of specific items, the user identifier, the user-country information, and the generated package identifier in correspondence with each other, in the first table.

5. The information processing apparatus according to claim 1, wherein:

the determining unit to refer to the second table, and determine two users whose program view histories are similar to each other, to determine, based on a difference of the program view histories of the users, a package identifier for each user corresponding to a program recommended to each of the users, and to extract information on the plurality of specific items corresponding to the package identifier for each user from the first table, and the notifying unit to notify a program reproducing apparatus of each of the users of information on the plurality of specific items corresponding to the package identifier for each of the users extracted by the determining unit.

6. The information processing apparatus according to claim 1, wherein:

a piece of information on the plurality of specific items is a program identifier uniquely allocated to each program in conformity with broadcast standard, the information processing apparatus further comprises a program-information-for-countries obtaining unit to obtain program information for a plurality of countries/territories in a target area, and a program-information-for-countries storing unit to store the obtained program information for the plurality of countries/territories, the determining unit to refer to the second table according to a program recommendation request including the user identifier and the user-country information from a program reproducing apparatus of a program-recommendation-request-source-user, and determine another user whose program view history is similar to the program view history of the program-recommendation-request-source-user, to determine, as a package identifier of a recommended program, at least one package identifier in the program view history of the other user, the at least one package identifier failing to be included in the program view history of the program-recommendation-request-source-user, to determine, based on user-country information included in the program recommendation request, program information for a corresponding country/territory in program information for the plurality of countries/territories stored in the program-information-for-countries storing unit, and to determine a consistency between information on a plurality of specific items corresponding to a package identifier of the recommended program and the determined program information for the country/territory, and the notifying unit to notify, in a case where the determining unit determines the consistency, a program reproducing apparatus of the program-recommendation-request-source-user of the program identifier in information on the plurality of specific items corresponding to a package identifier of the recommended program.

7. An information processing apparatus according to claim 1, in which the any identifier whose secondary use is limited by the intellectual property right includes a title of a respective program.

8. An information processing apparatus according to claim 1, in which the any identifier whose secondary use is limited by the intellectual property right includes a name of a respective broadcast station.

9. An information processing apparatus according to claim 1, in which the any identifier whose secondary use is limited by the intellectual property right includes information on staff or cast of a respective broadcast station.

10. The information processing method, comprising:

obtaining, by a package obtaining unit, from at least one program reproducing apparatus, the at least one program reproducing apparatus to obtain program information including information on a plurality of items for each broadcast program, to selectively receive and reproduce the broadcast program, and to transfer a package including information on a plurality of previously-determined specific items failing to include, as a content, information whose secondary use is limited by an intellectual property right, in the program information on a program viewed by a user, and a user identifier of the user, the package;

generating, by a package identifier generating unit, for each unique combination of information on the plurality of specific items included in the obtained package, a package identifier identifying the combination;

extracting, by a first table registering unit, information on the plurality of specific items from the obtained package, and registering the information on the plurality of specific items, a user identifier identifying a user of a program reproducing apparatus being a transfer source of the package, and the generated package identifier in correspondence with each other, in a first table;

extracting, by a second table registering unit, a correspondence relation between the user identifier and the package identifier from the first table, and registering the at least one package identifier corresponding to the user identifier, as a program view history for each user, in a second table;

determining, by a determining unit, the at least one package identifier being a difference between a plurality of program view histories similar to each other registered in the second table; and notifying, by a notifying unit, a program reproducing apparatus of a recommendation-target-user of at least part of information on the plurality of specific items registered in the first table corresponding to the determined package identifier, in which the plurality of specific items in the program information at least includes (i) an item of a program identifier uniquely allocated to each program in conformity with a broadcast standard which excludes any identifier whose secondary use is limited by the intellectual property right, and (ii) an item of information on broadcast date and time.

11. A program encoded on a non-transitory computer readable medium, causing a computer to function as:

a package obtaining unit to obtain, from at least one program reproducing apparatus, the at least one program reproducing apparatus being configured to obtain program information including information on a plurality of items for each broadcast program, to selectively receive and reproduce the broadcast program, and to transfer a package including information on a plurality of previously-determined specific items failing to include, as a content, information whose secondary use is limited by an intellectual property right, in the program information on a program viewed by a user, the package;

a first table storing unit to store a first table;

a package identifier generating unit to generate, for each unique combination of information on the plurality of specific items included in the obtained package, a package identifier identifying the combination;

a first table registering unit to extract information on the plurality of specific items from the obtained package, and to register the information on the plurality of specific items, a user identifier identifying a user of a program reproducing apparatus being a transfer source of the package, and the generated package identifier in correspondence with each other, in the first table;

a second table storing unit to store a second table;

a second table registering unit to extract a correspondence relation between the user identifier and the package identifier from the first table, and to register the at least one package identifier corresponding to the user identifier, as a program view history for each user, in the second table;

a determining unit to determine the at least one package identifier being a difference between a plurality of program view histories similar to each other registered in the second table; and a notifying unit to notify a program reproducing apparatus of a recommendation-target-user of at least part of information on the plurality of specific items registered in the first table corresponding to the package identifier determined by the determining unit, in which the plurality of specific items in the program information at least includes (i) an item of a program identifier uniquely allocated to each program in conformity with a broadcast standard which excludes any identifier whose secondary use is limited by the intellectual property right, and (ii) an item of information on broadcast date and time.

12. An information processing apparatus, comprising:

a package obtaining unit to obtain, from at least one program reproducing apparatus, the at least one program reproducing apparatus being configured to obtain program information including information on a plurality of items including a program identifier uniquely allocated to each program in conformity with broadcast standard, for each broadcast program, to selectively receive and reproduce the broadcast program, and to transfer a package including the program identifier in the program information on a program viewed by a user, the package;

a first table storing unit to store a first table;

a package identifier generating unit to generate, for each unique combination of the program identifier included in the obtained package and user-country information previously set to the program reproducing apparatus, a package identifier identifying the combination;

a first table registering unit to extract the program identifier from the obtained package, and to register the program identifier, the user-country information, and the generated package identifier in correspondence with each other, in the first table;

a second table storing unit to store a second table;

a second table registering unit to extract a correspondence relation between the user identifier and the package identifier from the first table, and to register the at least one package identifier corresponding to the user identifier, as a program view history for each user, in the second table;

a determining unit to determine the at least one package identifier being a difference between a plurality of program view histories similar to each other registered in the second table; and a notifying unit to notify a program reproducing apparatus of a recommendation-target-user of the program identifier and the user-country information registered in the first table corresponding to the package identifier determined by the determining unit, in which the plurality of specific items in the program information at least includes (i) an item of a program identifier uniquely allocated to each program in conformity with a broadcast standard which excludes any identifier whose secondary use is limited by an intellectual property right, and (ii) an item of information on broadcast date and time.

\* \* \* \* \*